United States Patent [19]
Fukawa et al.

[11] Patent Number: 5,204,377
[45] Date of Patent: Apr. 20, 1993

[54] POROUS, CRYSTALLIZED, AROMATIC POLYCARBONATE PREPOLYMER, A POROUS, CRYSTALLIZED AROMATIC POLYCARBONATE, AND PRODUCTION METHODS

[75] Inventors: Isaburo Fukawa, Fuji; Shinsuke Fukuoka, Kurashiki; Kyosuke Komiya, Kurashiki; Yoro Sasaki, Kurashiki, all of Japan

[73] Assignee: Asahi Kasei Kogyo Kabushiki Kaisha, Osaka, Japan

[21] Appl. No.: 442,353
[22] PCT Filed: Sep. 29, 1989
[86] PCT No.: PCT/JP89/00994
§ 371 Date: Oct. 17, 1989
§ 102(e) Date: Oct. 17, 1989

[30] Foreign Application Priority Data

| Dec. 27, 1988 | [JP] | Japan | 63-327678 |
| Mar. 28, 1989 | [JP] | Japan | 1-74048 |
| Jul. 4, 1989 | [JP] | Japan | 1-171084 |
| Jul. 14, 1989 | [JP] | Japan | 1-180434 |
| Jul. 27, 1989 | [JP] | Japan | 1-192670 |

[51] Int. Cl.$^5$ ............................................. C08J 9/28
[52] U.S. Cl. ..................................... 521/60; 521/56; 521/64; 521/180; 521/918
[58] Field of Search ................ 521/56, 60, 64, 180, 521/918

[56] References Cited

U.S. PATENT DOCUMENTS

| 4,661,528 | 4/1987 | Rei | 521/180 |
| 4,663,359 | 5/1987 | Rei | 521/180 |
| 4,686,239 | 8/1987 | Rei | 521/180 |

FOREIGN PATENT DOCUMENTS 52-109591 9/1977 Japan.

*Primary Examiner*—Morton Foelak
*Attorney, Agent, or Firm*—Fleit, Jacobson, Cohn, Price, Holman & Stern

[57] ABSTRACT

A porous, crystallized, aromatic polycarbonate prepolymer is disclosed, which comprises recurring aromatic carbonate units and terminal hydroxyl and aryl carbonate groups, wherein these terminal groups are in a specific molar ratio, and has specific number average molecular weight, surface area and crystallinity. The prepolymer can readily be converted by solid-state condensation polymerization to a porous, crystallized, aromatic polycarbonate having excellent properties. The porous, crystallized, aromatic polycarbonate of the present invention can readily be molded to obtain a shaped, porous, crystallized polycarbonate. The porous, crystallized, aromatic polycarbonate and the shaped, porous, crystallized polycarbonate of the present invention have excellent heat resistance and solvent resistance and exhibit advantageously low water absorption so that these are suited for use as a filter material, an adsorbent or the like. The porous, crystallized, aromatic polycarbonate and the shaped porous, crystallized polycarbonate of the present invention can also readily be molded by a melt process into an article useful as engineering plastics, such as an optical element and an electronic component, which is appreciated since it is free of impurities, such as chlorine-containing compounds, and has excellent properties.

23 Claims, 10 Drawing Sheets

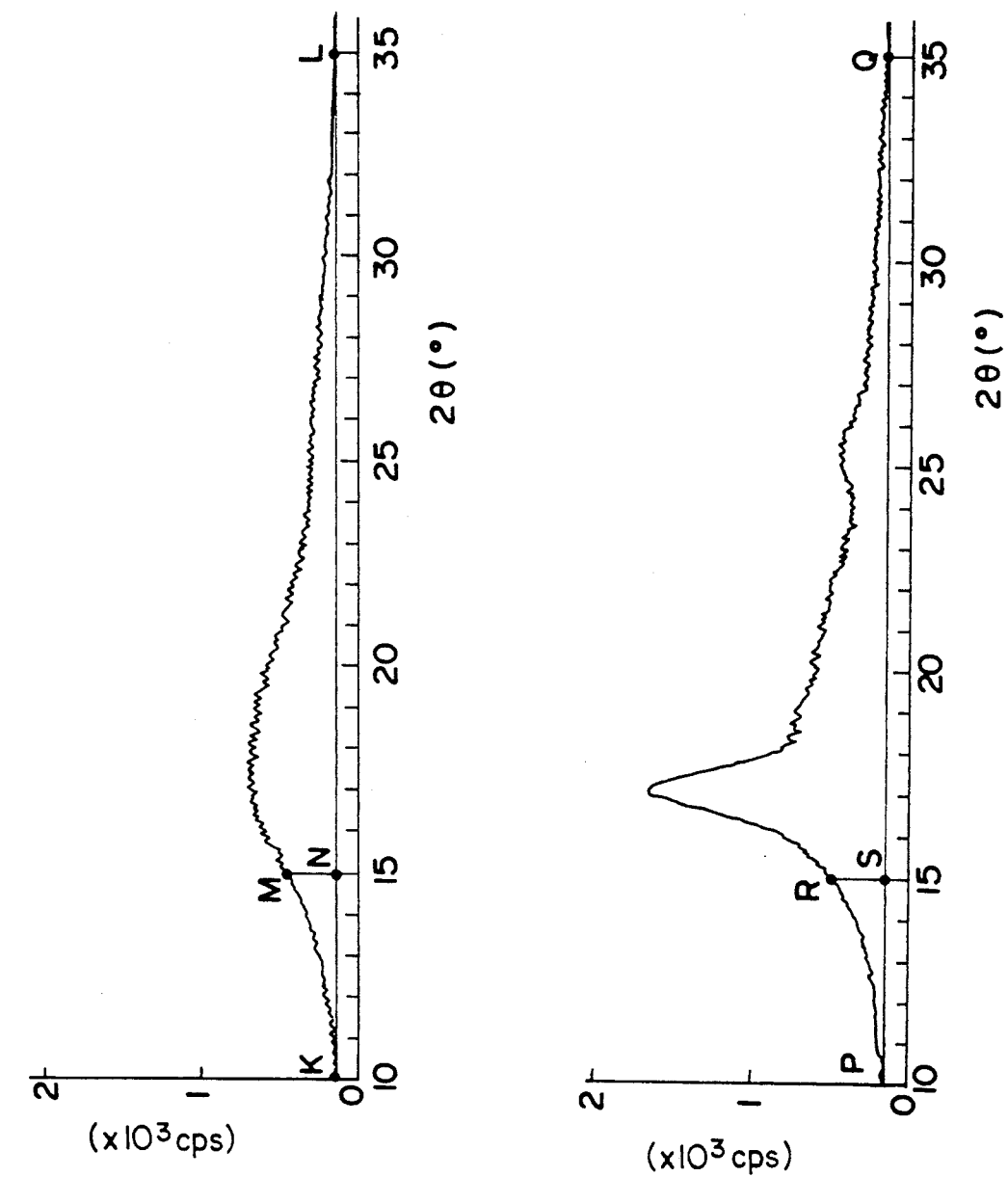

{ 5,204,377 }

POROUS, CRYSTALLIZED, AROMATIC POLYCARBONATE PREPOLYMER, A POROUS, CRYSTALLIZED AROMATIC POLYCARBONATE, AND PRODUCTION METHODS

TECHNICAL FIELD

The present invention relates to a porous, crystallized, aromatic polycarbonate prepolymer, a porous, crystallized aromatic polycarbonate, and production methods therefor. More particularly, the present invention is concerned with a porous, crystallized, aromatic polycarbonate prepolymer having terminal hydroxyl and aryl carbonate groups in a specific molar ratio and having a specific number average molecular weight, surface area and crystallinity, which can readily be converted by solid-state condensation polymerization to a porous, crystallized aromatic polycarbonate having excellent properties. The porous, crystallized aromatic polycarbonate of the present invention can readily be molded to obtain a shaped, porous, crystallized polycarbonate. The porous, crystallized aromatic polycarbonate and the shaped, porous, crystallized polycarbonate of the present invention have excellent heat resistance and solvent resistance and exhibit advantageously low water absorption so that they are suited for use as a filter material or an adsorbent. The porous, crystallized aromatic polycarbonate and the shaped porous, crystallized polycarbonate of the present invention can also be readily molded by a melt process into an article useful as engineering plastics, such as an optical element and an electronic component, which is appreciated since it is free of impurities, such as chlorine-containing compounds, and has excellent properties.

BACKGROUND ART

In recent years, aromatic polycarbonates have been widely employed in various fields as engineering plastics which have excellent heat resistance, impact resistance and transparency. Various studies have been made with respect to processes for producing aromatic polycarbonates. Up to now processes, such as one utilizing interfacial condensation polymerization of an aromatic dihydroxy compound, such as 2,2-bis(4-hydroxyphenyl)propane (hereinafter frequently referred to as "bisphenol A"), with phosgene (hereinafter frequently referred to as the "phosgene process"), have been commercially practiced. In the phosgene process, a mixed solvent of water or an aqueous alkali solution and a water-immiscible organic solvent are generally used. Commercially, a mixed solvent of an aqueous sodium hydroxide solution and methylene chloride are employed. As a catalyst for polymerization, a tertiary amine or a quaternary ammonium compound is employed. By-produced hydrogen chloride is removed as a salt with a base.

However, in the interfacial condensation polymerization process employing phosgene, (1) toxic phosgene must be used; (2) due to the by-produced chlorine-containing compounds, such as hydrogen chloride and sodium chloride, the apparatus used is likely to be corroded; (3) it is difficult to remove impurities which adversely influence the polymer properties, such as sodium chloride, from the polymer; and (4) since methylene chloride (which is generally used as a reaction solvent) is a good solvent for polycarbonate and has a strong affinity to polycarbonate, methylene chloride inevitably remains in produced polycarbonate. Removal of the remaining methylene chloride on a commercial scale is extremely costly, and complete removal of the remaining methylene chloride from the obtained polycarbonate is almost impossible. Further, it is noted that the methylene chloride remaining in the polymer is likely to be decomposed, e.g., by heat at the time of molding, thereby forming hydrogen chloride, which not only causes corrosion of a molding machine but also lowers the quality of the polymer. Furthermore, when it is intended to produce a polycarbonate having a high molecular weight (e.g., number average molecular weight of 15,000 or more), a methylene chloride solution of such a polycarbonate has an extremely high viscosity, thereby making agitation of the solution difficult. Additionally, sticky polymer solution is produced, and hence it becomes extremely difficult to separate the polymer from methylene chloride. Therefore, commercial production of a high quality, high molecular weight polycarbonate by the phosgene process is extremely difficult.

As mentioned above, the phosgene process involves too many problems to be practiced commercially.

Meanwhile, various methods are known in which an aromatic polycarbonate is produced from an aromatic dihydroxy compound and a diaryl carbonate. For example, a process, which is generally known as a transesterification process or a melt process, is commercially practiced. In this process, a polycarbonate is produced by performing a molten-state ester exchange reaction between bisphenol A and diphenyl carbonate in the presence of a catalyst, while effecting elimination of phenol. However, in order to attain the desired polymerization degree of the final aromatic polycarbonate according to this process, phenol and, finally, diphenyl carbonate need to be distilled off from a formed molten polycarbonate of high viscosity (e.g., 8,000 to 20,000 poise at 280° C.), and it is generally necessary to perform the reaction at a temperature as high as 280° to 310° C. in vacuo as high as 1 mmHg or less for a period of time as long as, e.g., 4 to 5 hours. Therefore, this process has many disadvantages. For example, (1) both special apparatus (suitable for reaction at high temperatures and under high vacuum) and a special stirrer of great power (useful under the high viscosity conditions of the product to be formed) are needed; (2) due to the high viscosity of the product, when a reactor or stirring type reactor (which is usually employed in the plastic industry) is used, only a polymer having a weight average molecular weight as low as about 30,000 is obtained; (3) due to the high temperature at which the reaction is performed, branching and crosslinking of the polymer are likely to occur, thereby rendering it difficult to obtain a polymer of good quality; and (4) due to long residence time at high temperatures, discoloration of the polymer is likely to occur [see Mikio Matsukane et al, Purasuchikku Zairyo Koza 5 "Porikaboneito Jushi" (Seminar on Plastic Materials 5, "Polycarbonate Resin"), Nikkan Kogyo Shinbun Publishing Co., p.62–67, Japan (1969)].

Moreover, with respect to the polycarbonate obtained by the melt process, it is known that the molecular weight distribution of the polymer is broad, and that the proportion of branched structure is high. Therefore, it is recognized that the polycarbonate produced by the melt process is inferior to that produced by the phosgene process in properties, such as mechanical strength, and that, particularly, the polycarbonate produced by the melt process is disadvantageous because of its brittle fracture properties, and it is also poor in moldability because of its non-Newtonian flow behavior [see Mikio Matsukane, "Kobunshi" (High Polymer), Japan, Vol. 27, p.521 (1978)].

Meanwhile, in the production of polyhexamethylene adipamide (nylon 66) and polyethylene terephthalate (PET), which are examples of the most popular condensation polymerized polymers, polymerization is generally conducted by a melt polymerization process until the polymer has a molecular weight at which mechanical properties sufficient for a plastic or a fiber are exhibited. With respect to this production, it is known that the polymerization degree of the thus produced polymer can be further increased by solid-state condensation polymerization in which the polymer is heated at a temperature (at which the polymer can remain in solid-state) at a reduced pressure or atmospheric pressure under a stream of, e.g., dry nitrogen. In this polymerization, it is believed that dehydration condensation is advanced in the solid polymer by the reaction of terminal carboxyl groups with adjacent terminal amino groups or terminal hydroxyl groups. Also, in the case of polyethylene terephthalate, condensation reaction by the elimination of ethylene glycol from the formed polymer occurs to some extent simultaneously with a condensation reaction between functional groups.

The reason why the polymerization degree of nylon 66 and polyethylene terephthate can be increased by solid-state condensation polymerization is that these polymers are inherently crystalline polymers having a high melting point (e.g., 265° C. and 260° C.) and, hence, these polymers can remain sufficiently in solid-state at a temperature at which solid-state polymerization proceeds (e.g., 230° C. to 250° C.). What is more important is that, for the above-mentioned polymers, the compounds to be eliminated are substances, such as water and ethylene glycol, that have a low molecular weight and relatively low boiling point and, therefore, can readily move within and through the solid polymer so that they can be removed from the reaction system as gases.

On the other hand, it has been proposed to employ a method for producing an aromatic polyester carbonate having a high molecular weight in which a high melting temperature aromatic polyester carbonate having both an aromatic ester bond and an aromatic carbonate bond is subjected to melt polymerization, and then subjected to solid-state condensation polymerization. According to this method, an aromatic dicarboxylic acid or aromatic oxycarboxylic acid, such as naphthalene dicarboxylic acid, p-hydroxybenzoic acid or terephthalic acid, is reacted with an aromatic dihydroxy compound and a diaryl carbonate in their molten state to prepare a prepolymer. Then, the prepolymer is crystallized and subjected to solid-state condensation polymerization. If the polymerization degree is increased to some extent by melt polymerization at 260° to 280° C., when p-hydroxybenzoic acid is used, the resultant product is no longer in a molten state but becomes solid. Since the resultant solid is a prepolymer having high crystallinity and a high melting temperature, it is not necessary to crystallize the solid further (see Japanese Patent Application Laid-Open Specification No. 48-22593, Japanese Patent Application Laid-Open Specification No. 49-31796, U.S. Pat. No. 4,107,143, Japanese Patent Application Laid-Open Specification No. 55-98224). However, these methods apply only to the production of an aromatic polyester carbonate containing 30% or more, generally 50% or more, of ester bonds, and it has been reported that, although an aromatic polyester carbonate containing less than 30 % of ester bonds was intended to be produced, fusion of a prepolymer occurred at the time of solid-state polymerization so that the solid-state condensation polymerization could not be conducted (Japanese Patent Application Laid-Open Specification No. 55-98224).

On the other hand, it is known that the presence of ester bonds as mentioned above promotes the carbonate bond-forming reaction when an aromatic polyester carbonate is produced by a melt condensation polymerization method (see Japanese Patent Application Publication Specification No. 52-36797). According to the Japanese Patent Application Publication Specification No 52-36797, when a high molecular weight aromatic polycarbonate having ester bonds is produced by melt condensation polymerization, the melt condensation polymerization reaction is markedly promoted by introducing ester bonds, in advance, into the molecular chain of an aromatic polycarbonate having a low polymerization degree. Naturally, it is believed that the above-mentioned effect of promoting the condensation polymerization reaction by the ester bonds may also be exhibited at the time of solid-state condensation polymerization. Therefore, it is relatively facile to increase the polymerization degree by solid-state condensation polymerization with respect to an inherently crystalline aromatic polyester carbonate having a high melting temperature, for example, a polymer having 40 mole % of ester bonds obtained from p-hydroxybenzoic acid, hydroquinone and diphenyl carbonate, or an aromatic polyester carbonate (such as a polymer having 55 mole % of ester bonds obtained from 2,6-naphthalene dicarboxylic acid, bisphenol A and diphenyl carbonate) which can easily become a crystalline polymer having a high melting temperature, by a simple crystallizing operation, for example, by heating at a predetermined temperature lower than the melting temperature.

However, no attempt has been made by any persons skilled in the art other than the group of the present inventors to produce a high molecular weight aromatic polycarbonate containing no ester bond by a method in which a prepolymer having a low molecular weight is first prepared by melt polymerization, and then the polymerization degree of the prepolymer is increased by solid-state condensation polymerization, except for the case where a specific highly crystalline polycarbonate having a melting temperature as high as 280° C. or more has been produced by solid-state condensation polymerization (see Example 3 of Japanese Patent Application Laid-open Specification No. 52-109591). Japanese Patent Application Laid-open Specification No. 52-109591 discloses a method in which melt polymerization of an aromatic dihydroxy compound comprising about 70% of hydroquinone and about 30% of bisphenol A with diphenyl carbonate is conducted at 280° C. under an extremely reduced pressure, i.e., 0.5 mmHg, to form a solidified prepolymer having a melting temperature of more than 280° C., and then the polymerization degree of the prepolymer is increased by solid-state condensation polymerization at 280° C. under 0.5 mmHg for 4 hours.

However, with respect to a substantially amorphous aromatic polycarbonate comprised mainly of a dihydroxydiaryl alkane, such as bisphenol A, no noteworthy attempt has been made by any persons skilled in the art other than the group of the present inventors to produce a polymer having a high molecular weight by first forming a prepolymer having a relatively low molecular weight and then subjecting the prepolymer to solid-state condensation polymerization. For example, in the phosgene process using an acid acceptor, which is the most representative method for producing an aromatic polycarbonate, since a compound, such as sodium chloride, to be removed from the reaction system to advance the condensation reaction is generally solid in the absence of a solvent, the compound hardly moves within and through the solid polymer. Therefore, it is difficult to remove the compound from the reaction system. It is thus not feasible to carry out this method using phosgene in a solid state condensation system.

With respect to a method for producing the most popular aromatic polycarbonate, i.e., a polycarbonate derived from bisphenol A by transesterification between bisphenol A and diphenyl carbonate, all of the studies have been directed toward a melt polymerization process at high temperature under highly reduced pressure. Studies of other persons skilled in the art any than the group of the present inventors have never been directed toward a method in which a prepolymer having a relatively low polymerization degree is first prepared, and then the polymerization degree of the prepolymer is increased by solid-state condensation polymerization to obtain a polycarbonate having a high molecular weight. Because polycarbonates derived from bisphenol A are amorphous polymers having a glass transition temperature (Tg) of from 149° to 150° C., it has been considered to be infeasible to subject polycarbonates derived from bisphenol A to solid-state condensation polymerization. In other words, in order for a prepolymer to be susceptible to solid-state condensation polymerization, it is generally required that the prepolymer not be fused but maintain its solid-state at a temperature higher than the glass transition temperature of the prepolymer (if the temperature is lower than the glass transition temperature of the prepolymer, molecular motion does not occur, thus precluding solid-state condensation polymerization). Amorphous polycarbonate which melts at a temperature of 150° C. or more is practically not susceptible to solid-state condensation polymerization.

The only proposals hitherto made for producing an aromatic polycarbonate comprised mainly of a dihydroxydiaryl alkane, such as bisphenol A, which is a substantially amorphous polymer, by solid-state condensation polymerization, are those disclosed by the group of the present inventors in Japanese Patent Application Laid-Open Specifications No. 63-223035, No. 64-1725, No. 64-4617, No. 64-16826 and No. 64-16827.

Japanese Patent Application Laid-Open Specifications No. 63-223035 and No. 64-4617 disclose that solid-state condensation polymerization can be effected in the production of a polycarbonate of bisphenol A by self condensation reaction of a bisalkyl carbonate of an aromatic dihydroxy compound, e.g., bis(methyl carbonate) of bisphenol A represented by the formula:

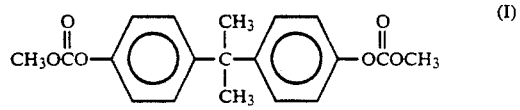  (I)

in which dimethyl carbonate groups are removed at an elevated temperature. In particular, in the methods of Japanese Patent Application Laid-Open Specifications No. 63-223035 and No. 64-4617, pre-polymerization is performed to obtain a prepolymer having methyl carbonate groups at both terminals thereof which is represented by the formula:

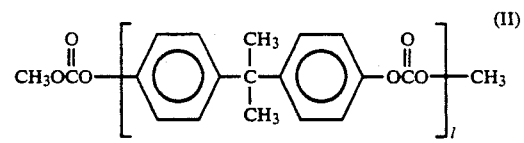  (II)

wherein l is an integer of from 2 to about 30, the prepolymer is subjected to solvent or heating treatment for effectuating crystallization of the prepolymer, and then solid-state condensation polymerization is performed.

On the other hand, Japanese Patent Application Laid-Open Specifications No. 64-1725, No. 64-16826 and No. 64-16827 disclose that a polycarbonate of bisphenol A can be produced by reacting, for example, bis(methyl carbonate) of bisphenol A represented by formula (I) with diphenyl carbonate to produce a prepolymer having a methyl carbonate group and a phenyl carbonate group as terminal groups [such as that represented by the formula:

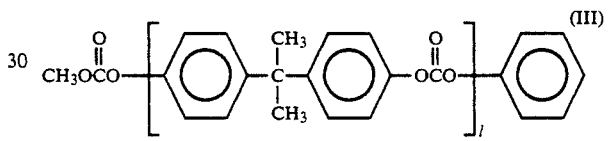  (III)

wherein l is as defined above], and subjecting the prepolymer to solvent or heating treatment for crystallizing the prepolymer and then to solid-state condensation polymerization. In the methods of these patent application laid-open specifications, as different from the methods of Japanese Patent Application Laid-Open Specifications No. 63-223035 and No. 64-4617, condensation polymerization is advanced by elimination reaction of methyl phenyl carbonate from the terminal methyl carbonate and phenyl carbonate groups.

Generally, in solid-state condensation polymerization, the polymerization temperature can be low as compared to that in molten-state polymerization. Accordingly, a major advantage of a solid-state polymerization method resides in that the thermal degradation of a polymer during the polymerization step is suppressed, and that hence a high quality polymer is obtained. However, the solid-state condensation polymerization has a grave drawback in that the polymerization rate is low. In the method of producing an aromatic polycarbonate through solid-state condensation polymerization which is accompanied by the above-mentioned elimination reaction of dimethyl carbonate or methyl phenyl carbonate groups as well, the polymerization rate is not sufficiently high and hence a prolonged polymerization time has been necessary. A catalyst can be used to increase the polymerization rate in solid-state condensation polymerization. However, the catalyst is likely to remain in the final polymer, and hence the use of a catalyst is likely to cause a problem of quality degradation of final polymers (e.g., occurrence of silver streaks on the surface of a shaped article of polymers).

DISCLOSURE OF THE INVENTION

The present inventors previously found that solid-state condensation polymerization could be effectively performed to increase the molecular weight of formed polycarbonate in the production of an aromatic polycarbonate from, as starting materials, a dihydroxyaryl compound composed mainly of a dihydroxydiaryl alkane, such as bisphenol A, and a diaryl carbonate, such as diphenyl carbonate, and filed patent applications (Japanese Patent Application No. 63-240785, International Patent Application No. PCT/JP88/00989 and Japanese Patent Application No. 63-327678). These applications disclose methods for producing a high quality aromatic polycarbonate in which a substantially amorphous prepolymer having hydroxyl and aryl carbonate groups as terminal groups is crystallized and then subjected to solid-state condensation polymerization, and the inventions of the applications are based on an unexpected finding that the crystallinity of a prepolymer plays an important role in the practice of solid-state condensation polymerization.

Ever since, the present inventors have continued studies with respect to an improved method for producing an aromatic polycarbonate by solid-state condensation polymerization. As a result, unexpectedly, the present inventors have found that the specific surface area of a crystallized aromatic polycarbonate prepolymer exerts a marked influence upon the practice of solid-state condensation polymerization. Further, the present inventors have unexpectedly found that a porous, crystallized aromatic polycarbonate prepolymer having terminal hydroxyl and aryl carbonate groups in a specific molar ratio and having specific number average molecular weight, specific surface area and crystallinity can readily be converted by solid-state condensation polymerization to a porous, crystallized, aromatic polycarbonate having excellent properties. Based on these unexpected findings, the present invention has been completed.

Accordingly, it is an object of the present invention to provide a porous, crystallized aromatic polycarbonate prepolymer which can readily be converted by solid-state condensation polymerization to a porous, crystallized, aromatic polycarbonate having excellent properties.

It is another object of the present invention to provide an efficient method for producing the above-mentioned prepolymer.

It is a further object of the present invention to provide a porous, crystallized, aromatic polycarbonate and a shaped, porous, crystallized polycarbonate having excellent heat resistance and solvent resistance, exhibiting advantageously low water absorption and being free of impurities.

It is still a further object of the present invention to provide an efficient method for producing each of the above-mentioned porous, crystallized, aromatic polycarbonate and shaped, porous, crystallized, aromatic polycarbonate.

The foregoing and other objects, features and advantages of the present invention will be apparent from the following detailed description and appended claims taken in connection with the accompanying drawings.

In one aspect of the present invention, there is provided a porous, crystallized, aromatic polycarbonate prepolymer comprising recurring aromatic carbonate units and terminal hydroxyl and aryl carbonate groups, wherein the molar ratio of the terminal hydroxyl groups to the terminal aryl carbonate groups is from 5/95 to 95/5, and having a number average molecular weight of from 1,000 to 15,000, a specific surface area of at least 0.2 m²/g and a crystallinity of at least 5%.

The porous, crystallized, aromatic polycarbonate prepolymer of the present invention comprises recurring aromatic carbonate units represented by formula (IV):

(IV)

wherein Ar is a divalent aromatic group, and terminal hydroxyl and aryl carbonate groups. The terminal hydroxyl group (—OH) is directly bonded to the aromatic group. The terminal aryl carbonate group is represented by formula (V):

$$-OCOAr^3$$ (V)

wherein $Ar^3$ is a monovalent aromatic group. The molar ratio of these terminal groups of the prepolymer is not specifically restricted and varied according to the number average molecular weight of the prepolymer, the properties of an aromatic polycarbonate intended to be produced from the prepolymer, and the like. Generally, the molar ratio of

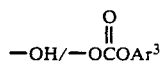

is within the range of from 5/95 to 95/5, preferably from 10/90 to 90/10, more preferably 20/80 to 80/20.

With respect to the molar ratio of the terminal groups of the prepolymer, an explanation is given below, referring to a prepolymer having a number average molecular weight of 4,000. When a ultra-high molecular weight aromatic polycarbonate having a molecular weight of, for example, 15,000 or more is intended to be produced from the prepolymer, it is preferred that the molar ratio of

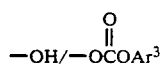

of the prepolymer be within the range of from 40/60 to 60/40, because a high polymerization rate can be attained. Production of the ultra-high molecular weight aromatic polycarbonate by the conventional phosgene process or melt process (transesterification process) is extremely difficult or impossible because the viscosity of the polymerization reaction mixture is rapidly increased before the intended ultra-high molecular weight aromatic polycarbonate is produced. However, by the method of the present invention, a prepolymer having the above-mentioned value of number average molecular weight and a molar ratio of the terminal groups within the above-mentioned range can be polymerized without being subjected to any influence of the viscosity of the reaction mixture. Therefore, by the use of the above prepolymer of the present invention, an ultra-high molecular weight aromatic polycarbonate can advantageously be produced. When it is intended to produce an aromatic polycarbonate (number average molecular weight of 6,000 to 13,000) to be used for injection molding or for extrusion molding, it is preferred that the amount of the terminal hydroxyl groups of the prepolymer be small relative to the amount of the terminal aryl carbonate groups. That is, it is preferred that the molar ratio of the terminal groups of the prepolymer, namely the molar ratio of

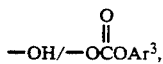

be within the range of from 5/95 to 49/51. On the other hand, when it is intended to produce an aromatic polycarbonate having a chemically reactive terminal hydroxyl group in a relatively large amount, it is preferred that the ratio of

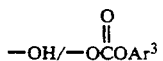

of the prepolymer be within the range of from 51/49 to 95/5.

The porous, crystallized, aromatic polycarbonate produced by solid-state condensation polymerization (hereinafter, frequently referred to simply as "solid-state polymerization") of each of the above-mentioned prepolymers having molar ratios of the terminal groups within the above-mentioned different ranges, generally has, as terminal groups, both hydroxyl groups and aryl carbonate groups. However, if desired, it is possible that the molar ratio of the terminal groups of the prepolymer is appropriately changed so as to produce an aromatic polycarbonate having, as terminal groups, hydroxyl groups only or aryl carbonate groups only.

Further, the prepolymer may also contain other terminal groups, for example ethyl carbonate groups, in addition to the terminal hydroxyl and aryl carbonate groups, as described later. In such a case, the above-mentioned ratio of the terminal groups is represented by the molar ratio of the total of the hydroxyl groups and other terminal groups (e.g., ethyl carbonate groups) to the aryl carbonate groups.

Aromatic group Ar of the recurring aromatic carbonate units is preferably a divalent aromatic group represented by, for example, formula (VI):

$$-Ar^1-Y-Ar^2- \qquad (VI),$$

wherein each of $Ar^1$ and $Ar^2$ independently represents a divalent carbocyclic or heterocyclic aromatic group having 5 to 30 carbon atoms, and Y represents a divalent alkane group having from 1 to 30 carbon atoms.

Each of divalent aromatic groups $Ar^1$ and $Ar^2$ is either unsubstituted or substituted with at least one substituent which does not adversely affect the solid-state polymerization reaction. Examples of suitable substituents include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

As the heterocyclic aromatic group, as used throughout this disclosure, aromatic groups having one or more ring nitrogen atoms, oxygen atoms or sulfur atoms may be mentioned.

Representative examples of divalent aromatic groups include a phenylene group, a naphthylene group, a biphenylene group and a pyridylene group, each of which is unsubstituted or substituted with at least one substituent, as mentioned above.

Representative examples of divalent alkane groups include organic groups represented by the formulae:

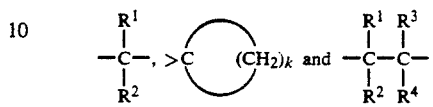

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring carbon atoms, a carbocyclic aromatic group having from 5 to 10 ring carbon atoms or a carbocyclic aralkyl group having from 6 to 10 carbon atoms, and k represents an integer of from 3 to 11, inclusive.

Preferred examples of divalent aromatic groups include those of the formulae:

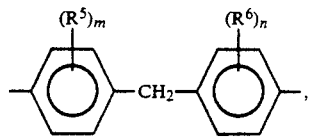

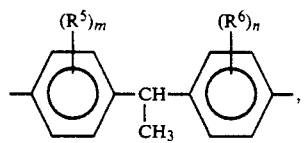

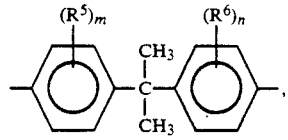

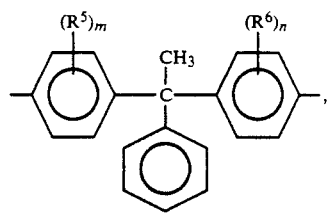

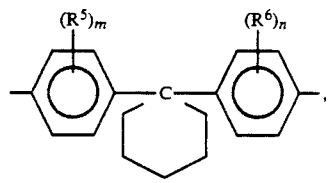

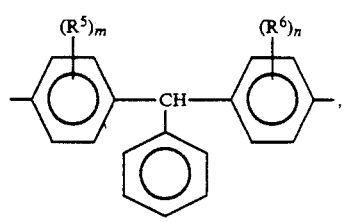

-continued

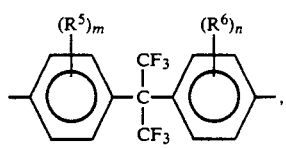

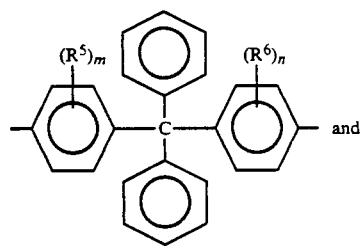
and

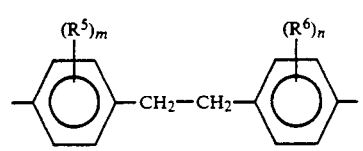

wherein each of $R^5$ and $R^6$ independently represents a hydrogen atom, a halogen atom an alkyl group having from 1 to 10 carbon atoms, an alkoxy group having from 1 to 10 carbon atoms, a cycloalkyl group having from 5 to 10 ring carbon atoms or a phenyl group; each of m and n independently represents an integer of from 1 to 4; when m is an integer of from 2 to 4, each $R^5$ may be the same or different; and when n is an integer of from 2 to 4, each $R^6$ may be the same or different.

Divalent aromatic group Ar may contain a divalent aromatic group represented by formula (VII):

$$-Ar^1-Z-Ar^2- \quad \text{(VII)}$$

wherein $Ar^1$ and $Ar^2$ are as defined above and Z represents a bond, or a divalent group, such as —O—, —CO—, —S—, —SO—, —SO$_2$—, —COO—, and —CON($R^1$)—, wherein $R^1$ is as defined above, in an amount of 0 to 15 mole %, based on the total number of moles of all of Ar's.

Examples of such divalent aromatic groups include those of the formulae:

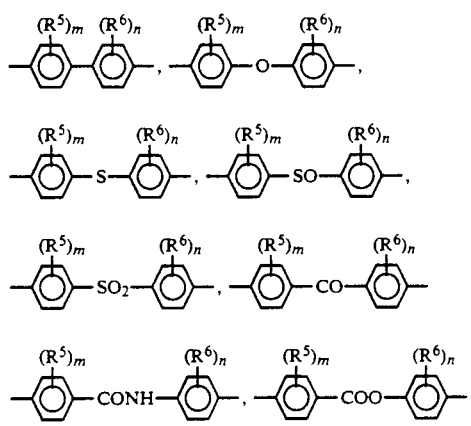

-continued

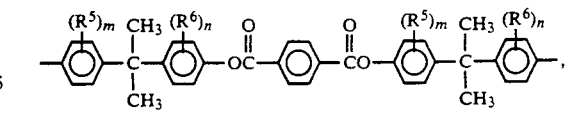

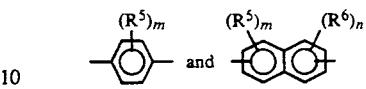
and wherein $R^5$, $R^6$, m and n have the same meanings as defined above.

The prepolymer of the present invention may contain, as Ar, one type of a divalent aromatic group mentioned above. Alternatively, the prepolymer may contain two or more different types of divalent aromatic groups.

The most preferred is a prepolymer containing an unsubstituted or substituted bisphenol A group represented by formula (VIII):

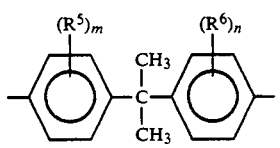

(VIII)

in an amount of 85 to 100 mole %, based on the total number of moles of all of Ar's.

The prepolymer may also contain a trivalent aromatic group in an amount of about 0.01 to 3 mole %, based on the total number of moles of all of Ar's.

$Ar^3$ of the terminal aryl carbonate group is either unsubstituted or substituted with at least one substituent which does not adversely affect the reaction. Examples of suitable substituents include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Representative examples of monovalent aromatic groups $Ar^3$ include a phenyl group, a naphthyl group, a biphenyl group and a pyridyl group, each of which is unsubstituted or substituted with at least one substituent, as mentioned above.

Representative examples of $Ar^3$ include

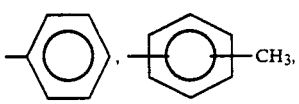

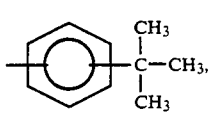

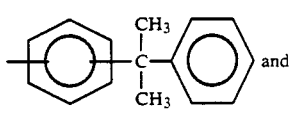
and

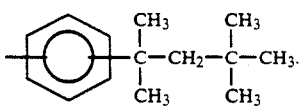

The porous, crystallized, aromatic polycarbonate prepolymer of the present invention has a number average molecular weight of from 1,000 to 15,000. When the number average molecular weight is less than 1,000, solid-state polymerization of the prepolymer disadvantageously takes a long period of time. Further, the prepolymer is disadvantageously fusion-bonded during the solid-state polymerization. On the other hand, it is unnecessary for the prepolymer to have a number average molecular weight of larger than 15,000, because the increase in number average molecular weight of the prepolymer larger than 15,000 does not have any special effect on the rate of the solid-state polymerization of the prepolymer. More preferred number average molecular weight is 1,500 to 13,000. The most preferred is a number average molecular weight of 2,000 to 8,000.

The porous, crystallized, aromatic polycarbonate prepolymer of the present invention has a specific surface area of at least 0.2 m²/g. Such a large specific surface area is important for producing an porous, crystallized, aromatic polycarbonate. When the specific surface area is smaller than 0.2 m²/g, the rate of the solid-state polymerization of the porous, crystallized, prepolymer is lowered, which is disadvantageous for producing an aromatic polycarbonate on a commercial scale. The larger the specific surface area of the porous, crystallized, aromatic polycarbonate prepolymer of the present invention, the higher the rate of the solid-state polymerization becomes, which is advantageous. From this standpoint, the specific surface area of the porous, crystallized, aromatic polycarbonate prepolymer of the present invention is at least 0.2 m²/g, preferably at least 0.5 m²/g, more preferably at least 0.8 m²/g.

The specific surface area is measured by the Brunauer-Emmett-Teller method (BET method) using a krypton gas.

The desired specific surface area of the crystallized prepolymer of the present invention, which is as large as 0.2 m²/g or more, is attained by solvent treatment for crystallizing and simultaneously rendering porous a prepolymer. The scanning electron micrographs of FIGS. 1, 2, 4, 5, 6, 7 and 8 clearly show that the prepolymer of the present invention is porous. For comparison, a scanning electron micrograph of an amorphous prepolymer which has not been subjected to solvent treatment is shown in FIG. 3, which shows that the amorphous prepolymer is non-porous.

The porous, aromatic polycarbonate prepolymer of the present invention is crystalline. The crystallinity of the prepolymer is at least 5% as measured by X-ray diffractometry. When the crystallinity of the prepolymer is less than 5%, it is disadvantageous in that the prepolymer is likely to be melted in the course of the solid-state polymerization for producing a final polycarbonate, causing the solid-state polymerization to be difficult to conduct. The upper limit of the crystallinity is not specifically restricted. However, for subjecting the prepolymer to solid-state polymerization to produce an aromatic polycarbonate, it is preferred that the crystallinity be not greater than 55% from the standpoint of the rate of solid-state polymerization. For facilitating the solid-state polymerization, the crystallinity of the prepolymer is preferably 10 to 45%, more preferably 15 to 40%.

In the present invention, the crystallinity of the porous, crystallized prepolymer is determined by using the powder X-ray diffraction patterns of a completely amorphous prepolymer and a porous, crystallized prepolymer (for example, see FIG. 10 and FIG. 11).

Generally, when a crystalline polymer is irradiated with an X-ray, scattered X-rays are observed. The total intensity of the scattered X-rays is a sum of the X-ray intensity of the crystalline scattering ascribed to the crystalline portion and that of the amorphous scattering ascribed to the amorphous portion. When the weight of the crystalline portion and that of the amorphous portion are expressed as $M_c$ and $M_a$, respectively, and when the X-ray intensity of the crystalline scattering corresponding to the weight of the crystalline portion and that of the amorphous scattering corresponding to the weight of the amorphous portion are expressed as $I_c$ and $I_a$, respectively, and $I_c$ and $I_a$ are assumed to be able to be distinguished from each other, the crystallinity $X_c$ (%) is calculated from the following equations:

$$X_c = \frac{M_c}{M_c + M_a} \times 100 = \frac{I_c}{I_c + KI_a} \times 100$$

$$K = \frac{I_{100c}}{I_{100a}}$$

wherein $I_{100c}$ represents the X-ray intensity of a crystalline scattering per unit weight of the perfectly crystalline portion and $I_{100a}$ represents the X-ray intensity of an amorphous scattering per unit weight of the perfectly amorphous portion.

However, in the present invention, assuming that $K=1$ with respect to all the porous, crystallized prepolymers, the crystallinity $X_c$ (%) was calculated from the following equation:

$$X_c = \frac{I_c}{I_c + I_a} \times 100.$$

The total X-ray diffraction intensity of a sample obtained by X-ray diffractometry is obtained as a sum of the crystalline scattering intensity, the amorphous scattering intensity and the background intensity due to the scattering by air, the scattering ascribed to the thermal motion of atoms, the Compton scattering and the like. Therefore, for obtaining the crystallinity of the sample, it is necessary to separate the total X-ray diffraction intensity into the component intensities mentioned above.

In the present invention, the total X-ray diffraction intensity is separated into the component intensities as follows. An explanation is given referring to FIGS. 10 and 11.

On the powder X-ray diffraction pattern of a porous, crystallized prepolymer (shown in FIG. 11), straight line P-Q (base line) is drawn between the point (P) of 10° (2θ) and the point (Q) of 35° (2θ). The point corresponding to 15° (2θ) on the diffraction intensity curve and the point corresponding to 15° (2θ) on the base line, at each of which points the crystalline scattering intensity is considered to be zero, are designated R and S, respectively.

On the other hand, on the powder X-ray diffraction pattern of a completely amorphous prepolymer (shown in FIG. 10) (obtained by melting the prepolymer at a temperature of from 280° to 300° C., shaping the molten prepolymer into a sheet form having a thickness of about 1 mm, and rapidly cooling the sheet to 0° C.), straight line K-L (base line) is drawn. Further, the point corresponding to 15° ($2\theta$) on the diffraction intensity curve and the point corresponding to 15° ($2\theta$) on the base line are designated M and N, respectively.

The following identities are given:
$I_1$ = the diffraction intensity at point M
$B_1$ = the diffraction intensity at point N
$I_2$ = the diffraction intensity at point R
$B_2$ = the diffraction intensity at point S
Y = the area of the portion surrounded by diffraction intensity curve K-M-L and straight line K-L, and
Z = the area of the portion surrounded by diffraction intensity curve P-R-Q and straight line P-Q.

The crystallinity Xc (%) is calculated from the following equation:

$$Xc\ (\%) = \frac{1}{Z}\left(Z - \frac{I_2 - B_2}{I_1 - B_1} \cdot Y\right) \times 100.$$

The porous, crystallized, aromatic polycarbonate prepolymer of the present invention is, generally, in powder form or in agglomerated powder form. The powder form of porous, crystallized, aromatic polycarbonate prepolymer has an average particle diameter of not greater than 250 $\mu$m. The agglomerated powder form of porous, crystallized, aromatic polycarbonate prepolymer has an average diameter of not greater than 3 mm. In this connection, it should be noted that when a powder or agglomerated powder form of a porous, crystallized, aromatic polycarbonate prepolymer is subjected to solid-state polymerization, it is preferred that the content of too fine particles in the prepolymer be as small as possible from the standpoint of ease in handling. Further, when the amount of fine particles present in the powder form or agglomerated powder form of the prepolymer is large, it is disadvantageous in that the particles of both the prepolymer and the formed polymer are likely to be fused and bonded with one another or adhered to a reaction vessel in the course of the solid-state polymerization. From these standpoints, it is preferred that the content of particles having a particle diameter as small as 50 $\mu$m or less in the prepolymer be not greater than 10% by weight.

According to the present invention, from the viewpoint of ease in handling, it is preferred that the porous, crystallized, aromatic polycarbonate prepolymer be in granular form. It is more preferred that the granular form of porous, crystallized, aromatic polycarbonate prepolymer have a compressive break strength of at least 5 kgf cm$^2$. When the compressive break strength is lower than 5 kgf/cm$^2$, it is disadvantageous in that too fine particles are formed before and during the solid-state polymerization, causing the handling of prepolymer to be difficult. It is preferred that the compressive break strength be as large as possible. However, in general, it is sufficient for the granular form of prepolymer to have a compressive break strength of at least 5 kgf/cm$^2$.

It is most preferred that the above-mentioned granular form of prepolymer have a crystallinity of at least 5%, preferably not greater than 55% (X-ray diffractometry). These granular form of the porous, crystalized prepolymer is advantageous not only in that the handling of the prepolymer before and after the solid-state polymerization is easy; the scattering of a powdery prepolymer is avoided when the prepolymer is subjected to solid-state polymerization; and the prepolymer is not fused during the solid-state polymerization, but also in that the rate of the solid-state polymerization can be markedly increased.

The shape of the granular form of prepolymer is not specifically restricted, and it may generally be a pellet, sphere, cylinder, disc, polygonal pillar, cube, rectangular parallelepiped, lens or the like.

The average diameter of granules of the granular form of prepolymer may generally be 0.5 to 30 mm, preferably 0.8 to 10 mm, more preferably 1 to 5 mm. When the average particle diameter is smaller than 0.5 mm, it is disadvantageous in that the fine particles of the prepolymer scatters and the prepolymer is likely to be fused. On the other hand, the granular form of prepolymer having an average diameter of greater than 30 mm is not preferred from the standpoint of ease in handling.

In the present invention, the diameter of granules of the granular form of prepolymer is defined as the volume average diameter defined in "Zoryu-Binran (Granulation Handbook)", edited by the Society of Powder Industry in Japan, published in 1975, pp. 19–20. Illustratively stated, the volume average diameter is defined by the following formula:

*Volume average diameter* = $3Lwh/(Lw + wh + hL)$, wherein w is the short axis diameter (which is defined as the distance between a pair of parallel lines which is the smallest among the distances between any pair of parallel lines drawn so as to hold therebetween the projected image of a granule on a plane, which granule is stably put on the plane), L is the long axis diameter [which is defined as the distance between a pair or parallel lines (which are perpendicular to the pair of parallel lines used for defining the short axis diameter) drawn so as to hold therebetween the projected image of the granule], and h is the height of the granular form of prepolymer.

In another aspect of the present invention, there is provided a method for producing a powder form of porous, crystallized, aromatic polycarbonate prepolymer, which comprises treating an amorphous aromatic polycarbonate prepolymer with solvent under sufficient shearing force to crystallize and render porous the amorphous aromatic polycarbonate prepolymer, the amorphous aromatic polycarbonate prepolymer comprising recurring carbonate units and terminal hydroxyl and aryl carbonate groups, wherein the molar ratio of the terminal hydroxyl groups to the terminal aryl carbonate groups is from 5/95 to 95/5, and having a number average molecular weight of 1,000 to 15,000, the shearing force being sufficient to cause the resultant powdery, porous, crystallized, aromatic polycarbonate prepolymer to have an average particle diameter of 250 $\mu$m or less.

The amorphous aromatic carbonate prepolymer comprising recurring carbonate groups and having terminal hydroxyl and aryl carbonate groups, and having a number average molecular weight of 1,000 to 15,000, which is used as a starting material, may generally be prepared by pre-polymerization as will be described later. Then, the amorphous prepolymer is treated with solvent under a high shearing force sufficient to reduce the prepolymer to particles having an average particle diameter of 250 $\mu$m or less, to thereby crystallize and simultaneously render porous the amorphous prepolymer. In this method, the amorphous prepolymer to be treated with solvent may be either in the solid state or in the molten state. The crystallization and pore formation of the amorphous prepolymer occur from its surface. Therefore, for obtaining a porous, crystallized prepolymer of the present invention having a specific surface area of at least 0.2 m$^2$/g, it is necessary that the treatment of the prepolymer with solvent be conducted while mechanically pulverizing the prepolymer under high shearing force to the prepolymer so as to reduce the prepolymer to particles having an average particle diameter of 250 μm or less. The average particle diameter used herein means that of the prepolymer in the solvent which is determined by a method as will be described later. The mechanical pulverization under high shearing force may easily be conducted by a method using an apparatus equipped with a high speed-rotating blade, such as a warning blender, or using a centrifugal pump equipped with a cutter. For shortening the time required for the crystallization and pore formation, it is preferred that the amorphous prepolymer to be treated with solvent be in the form of a fiber, a strand, a film, beads or the like, irrespective of the state of the amorphous prepolymer, that is, the solid state or the molten state.

The time required for crystallizing and rendering porous an amorphous prepolymer in solvent is varied according to the type, molecular weight and shape of the amorphous prepolymer, the type of the solvent, the treating temperature and the like. Generally, the crystallization and pore formation may be accomplished within several seconds to several hours. The temperature may generally be chosen in the range of from $-10°$ to 200° C. From the standpoints of the crystallization rate and ease in obtaining a porous, crystallized, aromatic polycarbonate prepolymer having a large specific surface area, it is preferred that the crystallization be conducted at a temperature as high as possible within the above-mentioned range.

Representative examples of solvents which can be used for crystallizing and rendering porous the amorphous prepolymer include halogenated aliphatic hydrocarbons, such as methyl chloride, methylene chloride, chloroform, tetrachloromethane, ethyl chloride, dichloroethanes (all position isomers), trichloroethanes (all position isomers), trichloroethylene and tetrachloroethanes (all position isomers); halogenated aromatic hydrocarbons, such as chlorobenzene and dichlorobenzene; ethers, such as tetrahydrofuran and dioxane; ketones, such as acetone and methylethylketone; aromatic hydrocarbons, such as benzene, toluene and xylene; and the like. These solvents may be used individually or in combination. Of these, acetone is most preferred because it is effective for obtaining a porous, crystallized, aromatic polycarbonate prepolymer having a relatively large specific surface area.

The amount of the solvent to be used for crystallizing and rendering porous the amorphous prepolymer is varied according to the types of the amorphous prepolymer and solvent, the desired crystallinity and desired specific surface area of the ultimate prepolymer, the crystallizing temperature, and the like. Generally, the solvent may be used in an amount of 0.1 to 100 times, preferably 0.3 to 50 times the weight of the amorphous prepolymer.

By the above-mentioned method, a powder form of porous, crystallized, aromatic polycarbonate prepolymer having the desired crystallinity and the desired specific surface area is obtained. Sometimes, the thus obtained powder form of prepolymer contains too fine particles. For reducing the amount of too fine particles, it is preferred that particles (primary particles) of the powder form of prepolymer be subjected to agglomeration to form secondary particles. Thus, the porous, crystallized, aromatic polycarbonate prepolymer is obtained in agglomerated powder form (secondary particle form).

Accordingly, in a further aspect of the present invention, there is provided a method for producing an agglomerated powder form of porous, crystallized, aromatic polycarbonate prepolymer, which comprises applying sufficient pressure or heat to particles of a powder form of porous, crystallized, aromatic polycarbonate prepolymer mentioned above, to cause the particles to be cohered.

The application of sufficient pressure to particles of a powder form of porous, crystallized, aromatic polycarbonate prepolymer may advantageously be conducted simultaneously with the removal of the solvent used for crystallizing and rendering porous the amorphous prepolymer after completion of the crystallization and pore formation. Illustratively stated, the solvent is generally removed by centrifugation, filtration under pressure, filtration under reduced pressure, or the like, by which a pressure is applied to the prepolymer simultaneously. This pressure is sufficient for the agglomeration of a powder, i.e., secondary particle formation. Therefore, agglomeration of a powder of prepolymer can advantageously be performed simultaneously with the removal of the solvent. The thus formed secondary particle (agglomerated powder form) of the prepolymer is stable, and hardly to be reduced to too minute particles even after the solvent is completely removed from the prepolymer. The reason for this has not yet been elucidated, but it is believed that a low molecular weight polycarbonate oligomer present in the prepolymer acts as an adhesive for bonding too minute particles. In view of the above, when the amorphous prepolymer contains a low molecular polycarbonate oligomer in an extremely small amount, it is preferred that a low molecular weight polycarbonate oligomer be added to the amorphous prepolymer before the crystallization and pore formation be conducted.

Agglomeration for forming secondary particles may also be conducted utilizing the fusion-bonding property of the powder form of prepolymer. That is, a powder form of prepolymer is sufficiently heated to such a temperature that the surfaces of the particles of the prepolymer are fused slightly, to thereby agglomerate the powder.

In the above-mentioned method, a powder form of porous, crystallized, aromatic polycarbonate prepolymer to be used as a starting material for producing an agglomerated form of prepolymer has a specific surface area of at least 0.2 m$^2$/g, preferably at least 0.5 m$^2$/g. The crystallinity of the powder form of prepolymer is at least 5%, preferably not greater than 55%.

The thus obtained powder or agglomerated powder form of porous, crystallized, aromatic polycarbonate prepolymer may be granulated to produce a granular form of porous, crystallized, aromatic polycarbonate prepolymer mentioned above. Thus, in still a further aspect of the present invention, there is provided a method for producing a granular form of porous, crystallized, aromatic polycarbonate prepolymer, which comprises granulating a powder form or an agglomerated powder form of porous, crystallized, aromatic polycarbonate prepolymer.

The method for granulating the powder or agglomerated powder form of prepolymer is not specifically restricted. Generally, granulation of the prepolymer can easily be performed by a conventional method, such as a rolling method, a vibration method, a compression molding method and an extrusion molding method. Of these methods, extrusion-granulation by an extrusion molding method and compression-granulation by a compression molding method are most preferred, because a granular shaped article of the present invention having a compressive break strength of at least 5 kgf cm² can easily be produced. The granulation can advantageously be performed, using a commercially available tablet machine or granulator, at a temperature of not greater than the crystalline melting point of the prepolymer, preferably 0° to 100° C.

Production of a granular form of prepolymer may be conducted in dry state using a dry powder form or a dry agglomerated powder form of porous, crystallized prepolymer, or in wet state using a powder form or an agglomerated powder form of prepolymer wetted with an appropriate liquid. Preferred is the wet state method, because a powder form or an agglomerated powder form of prepolymer produced by the crystallization and pore formation can be subjected to granulation without completely removing the solvent therefrom.

The above-mentioned porous, crystallized, aromatic polycarbonate prepolymers in powder form, agglomerated powder form and granular form can advantageously be used as prepolymers to be subjected to solid-state condensation polymerization, to thereby produce porous, crystallized, aromatic polycarbonates. From the powder form or an agglomerate powder form of prepolymer, a powder form or an agglomerated powder form of porous, crystallized, aromatic polycarbonate is produced. On the other hand, from the granular form of prepolymer, a granular form of porous, crystallized, aromatic polycarbonate is produced.

Hereinbelow, an explanation is given with respect to the production of a powder form or an agglomerated powder form of porous, crystallized, aromatic polycarbonate. That is, according to the present invention, there is provided a method for producing a powder form or an agglomerated powder form of porous, crystallized, aromatic polycarbonate having a number average molecular weight of from 6,000 to 200,000 and a crystallinity of at least 35%, which comprises heating a powder form or an agglomerated powder form of porous, crystallized, aromatic polycarbonate prepolymer in a heating zone, at a temperature which is higher than the glass transition temperature of the prepolymer and at which the prepolymer is in a solid state, to effect solid-state condensation polymerization of the prepolymer while removing condensation polymerization by-products from the heating zone, thereby increasing the number average molecular weight and the crystallinity of the prepolymer to from 6,000 to 200,000 and at least 35%, respectively, so that the resultant polycarbonate has a number average molecular weight and a crystallinity which are, respectively, greater than those of the prepolymer.

In the above method, it is more preferred that the porous, crystallized, aromatic carbonate prepolymer to be subjected to solid-state polymerization have a specific surface area of at least 0.5 m²/g. Further, it is preferred that the porous, crystallized aromatic carbonate prepolymer have a crystallinity of from 5 to 55%.

The solid-state polymerization in the method of the present invention is conducted by heating a powder form or an agglomerated powder form of porous, crystallized, aromatic polycarbonate prepolymer in a heating zone. The temperature (Tp, °C.) and time required for the solid-state polymerization vary depending upon the chemical structure, molecular weight, crystallinity, melting point (Tm, ° C.) and shape of the porous, crystallized, aromatic polycarbonate prepolymer; the presence or absence of a catalyst remaining in the porous, crystallized, aromatic polycarbonate prepolymer; the type and amount of a catalyst, if any, in the porous, crystallized, aromatic polycarbonate prepolymer; the type and amount of a catalyst if added to the polymerization system; the specific surface area of the porous, crystallized, aromatic polycarbonate prepolymer; the polymerization degree of the desired crystallized, aromatic polycarbonate; and the like. But, the solid-state polymerization must be conducted at a temperature which is higher than the glass transition temperature of the porous, crystallized prepolymer and at which the porous, crystallized, aromatic polycarbonate prepolymer is not melted but in a solid state (namely, a temperature of lower than the crystalline melting temperature of the prepolymer). It is more preferred that the solid-state polymerization be conducted at a temperature (Tp, °C.) satisfying the following relationships:

$$Tm - 50 \leq Tp < Tm \quad (v)$$

wherein Tp and Tm are as defined above. In this connection, it is to be noted that both the glass transition temperature and the crystalline melting temperature of the prepolymer are elevated with the progress of the polymerization of the prepolymer. Therefore, the suitable temperature for solid-state polymerization also becomes high with the progress of the polymerization. The reaction time for solid-state polymerization is generally in the range of from one minute to 100 hours, preferably in the range of from 0.1 to 50 hours. With respect to the temperature for solid-state polymerization, for example, when a polycarbonate is prepared from bisphenol A, the temperature for the solid-state polymerization is in the range of from about 150° to about 260° C., preferably from about 180° to about 230° C.

In the solid-state condensation polymerization, condensation polymerization by-products, such as an aromatic monohydroxyl compound and a diaryl carbonate, are formed in the heating zone. The solid-state condensation polymerization reaction may be accelerated by removing the by-products from the polymerization reaction system. The by-products may be removed by a method in which the polymerization reaction is carried out under reduced pressure, or a method in which an inert gas is flowed into the heating zone and the inert gas containing the condensation polymerization by-products is discharged from the heating zone. The term "inert gas" used herein means not only those defined by the so-called inert gas as an established term, such as nitrogen gas, argon gas, helium gas and carbon dioxide gas, but also a gas which is not reactive during the solid-state polymerization, such as lower hydrocarbon gas and acetone gas. These methods are optionally conducted in combination. In the method using an inert gas, it is preferred to heat the gas preliminarily to a temperature adjacent the polymerization reaction temperature. The flow rate of the inert gas flowing into the heating zone may generally be from 0.1 to 10 liters(N.T.P.)/hour, preferably from 0.2 to 7 liters(N.T.P.)/hour, per gram of the porous, crystallized, aromatic polycarbonate prepolymer. The flow rate of the inert gas per unit weight of the prepolymer is important. When the flow rate of the inert gas is less than 0.1 liter(N.T.P.)/hour per gram of the prepolymer, it is disadvantageous in that the rate of the solid-state polymerization becomes low. On the other hand, when the flow rate of the inert gas is greater than 10 liters(N.T.P.)/hour per gram of the prepolymer, although the rate of the solid-state polymerization becomes high, the powder form or agglomerated powder form of porous, crystallized, aromatic carbonate prepolymer is, disadvantageously, likely to scatter in the reaction vessel during the solid-state condensation polymerization, leading to a fusion-adhesion of the prepolymer to the wall of the reaction vessel and an escape of the prepolymer out of the reaction vessel.

When the solid-state polymerization is conducted while flowing an inert gas into the heating zone, the discharged inert gas may be discarded without the re-use thereof. Alternatively, in order to reduce the production cost, the discharged inert gas may be recovered and re-used. The discharged inert gas contains condensation polymerization by-products mentioned above, such as an aromatic monohydroxyl compound and a diaryl carbonate. Therefore, it has been considered that when the discharged inert gas is recovered and re-used, it is necessary to remove the by-products contained in the inert gas. However, it has unexpectedly been found that even if the inert gas contains the by-products, when the content of the condensation polymerization by-products of the discharged inert gas is 5 mmHg or less in terms of the partial pressure of the by-products in the inert gas, such an inert gas containing the by-products can be re-used for the solid-state condensation polymerization of the prepolymer, and the condensation polymerization can advantageously be performed. Therefore, in the method of the present invention, the discharged inert gas having a by-products content of 5 mmHg or less in terms of the partial pressure of the by-products in the inert gas may advantageously be flowed into the heating zone as the inert gas and re-used for the solid-state polymerization. Of course, from the standpoint of complete avoidance of the adverse reaction during the solid-state polymerization, it is most preferred that the by-products be completely removed from the discharged inert gas. However, it is extremely difficult to remove the by-products from the discharged inert gas to an extent that the content of the by-products in the discharged inert gas is less than 0.01 mmHg in terms of the partial pressure. The reduction of the by-products content in the inert gas may generally be conducted by removing the by-products from the discharged inert gas or by diluting the discharged inert gas with a fresh inert gas.

The solid-state polymerization according to the method of the present invention may be carried out by using a batch-wise method or a continuous method, or by using both methods in combination. As a reactor for the solid-state condensation polymerization, various types of reactors, for example, a tumbler type, a kiln type, a paddle-dryer type, a screw-conveyer type, a vibrator type, a fluidized-bed type, a fixed-bed type, a moving bed type and the like can be used.

The solid-state condensation polymerization for producing the porous, crystallized, aromatic polycarbonate from the porous, crystallized prepolymer may be performed at an economically satisfactory reaction rate without using a catalyst. This is the most preferred mode of the present method. Alternatively, a catalyst may be added in order to accelerate the polymerization reaction rate. However, when a catalyst is used, such a catalyst is likely to remain in the final aromatic polycarbonate as an impurity and such a impurity catalyst often has adverse effects on the physical properties of the aromatic polycarbonate (such as color, heat resistance, boiled water resistance and weatherability). Therefore, it is preferred that the amount of a catalyst to be used be as small as possible.

When the porous, crystallized, aromatic polycarbonate prepolymer of the present invention to be used as a starting material for producing a porous, crystallized, aromatic polycarbonate is produced using a catalyst, the catalyst generally remains in the prepolymer and, therefore, a further catalyst need not be added to the solid-state polymerization system. However, in the case where the catalyst is removed or inactivated in the course of the crystallization and pore formation of the prepolymer and it is still desired to accelerate the solid-state polymerization, an appropriate catalyst may optionally be added to the solid-state polymerization reaction system. In this case, a catalyst may be added in a liquid or gas form to a polymerization system of the porous, crystallized prepolymer. As such a catalyst, any condensation polymerization catalyst conventionarily used in the art can be used. Examples of such catalysts include hydroxides of an alkali or alkaline earth metal, such as lithium hydroxide, sodium hydroxide, potassium hydroxide and calcium hydroxide; hydrides of an alkali or alkaline earth metal, such as lithium hydride, sodium hydride and calcium hydride; alkali metal salts, alkaline earth metal salts and quarternary ammonium salts of boron hydride or aluminum hydride, such as lithium aluminum hydride, sodium boron hydride and tetramethyl ammonium boron hydride; alkoxides of an alkali or alkaline earth metal, such as lithium methoxide, sodium ethoxide and calcium methoxide; aryloxides of an alkali or alkaline earth metal, such as lithium phenoxide, sodium phenoxide, magnesium phenoxide, LiO-Ar-OLi wherein Ar is an aryl group and NaO-Ar-ONa wherein Ar is as defined above; organic acid salts of an alkali or alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate and triphenyl borate; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, diaryltin oxide, dialkyltin carboxylate, tin acetate, tin compounds having an alkoxy group or aryloxy group bonded to tin, such as ethyltin tributoxide and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxides; and zirconium compounds, such as zirconium acetate, zirconium oxide, zirconium alkoxides and zirconium aryloxides and zirconium acetylacetone.

These catalysts may be used individually or in combination. The amount of catalyst to be used is as follows. When a catalyst containing a metal is used, the amount of the catalyst is generally in the range of from 1 ppm to 500 ppm by weight, in terms of the amount of the metal contained in the catalyst, based on the weight of the porous, crystallized, aromatic polycarbonate prepolymer used as the starting material. When a catalyst containing no metal is used, the amount of the catalyst is generally in the range of from 1 ppm to 500 ppm by weight, in terms of the amount of the atom as a cation species contained in the catalyst, based on the weight of the prepolymer.

As mentioned above, in the method of the present invention, the intended prepolymer can readily be prepared in the absence of any catalyst, and the aromatic polycarbonate produced without using a catalyst has an extremely excellent properties. This is one of the main features of the present invention. In the present invention, the terminology "in the absence of a catalyst" means that the amount of a catalyst is smaller than 1 ppm that is the minimum in the above-mentioned amount range.

According to the above-mentioned method of the present invention, a powder form or an agglomerated powder form of porous, crystallized, aromatic polycarbonate having a number average molecular weight of from 6,000 to 200,000 and a crystallinity of at least 35%, wherein the number average molecular weight and crystallinity of the aromatic polycarbonate are greater than those of the porous, crystallized prepolymer used as a starting material, can easily be produced.

Further, according to the method of the present invention, a powder form or an agglomerated powder form of porous, crystallized, aromatic polycarbonate having a specific surface area of at least 0.1 m$^2$/g can advantageously be produced.

Furthermore, according to the method of the present invention, a powder form or an agglomerated powder form of porous, crystallized, aromatic polycarbonate having a crystallinity of not greater than 70%, which is greater than that of the prepolymer used as a starting material, can easily be obtained.

Next, an explanation is given with respect to the production of a granular form of porous, crystallized, aromatic polycarbonate. That is, according to the present invention, there is provided a method for producing a granular form of porous, crystallized, aromatic polycarbonate having a number average molecular weight of from 6,000 to 200,000 and a crystallinity of at least 35%, which comprises heating a granular form of porous, crystallized, aromatic polycarbonate prepolymer in a heating zone, at a temperature which is higher than the glass transition temperature of said prepolymer and at which said prepolymer is in a solid state, to effect solid-state condensation polymerization of said prepolymer while removing condensation polymerization by-products from the heating zone, thereby increasing the number average molecular weight and the crystallinity of the prepolymer to from 6,000 to 200,000 and at least 35%, respectively, so that the resultant polycarbonate has a number average molecular weight and a crystallinity which are, respectively, greater than those of said granular prepolymer.

The heating of granular form of porous, crystallized, aromatic polycarbonate prepolymer can be conducted in substantially the same manner as in the production of the powder form or the agglomerated powder form of polycarbonate mentioned above, except that a granular form of porous, crystallized, aromatic polycarbonate prepolymer is used as a starting material. In practicing the above-mentioned method, it is preferred that the heating of the granular form of prepolymer be conducted while flowing an inert gas into the heating zone and while discharging the inert gas containing the condensation polymerization by-products from the heating zone. The flow rate of the inert gas may generally be in the range of from 0.1 to 50 liters(N.T.P.)/hour, per gram of the granular form of prepolymer. In the case of the solid-state polymerization of the granular form of prepolymer, there is no problem of the scattering of the prepolymer. Therefore, the flow rate of the inert gas can be increased up to 50 liters(N.T.P.)/hour, per gram of the granular form of prepolymer. The rate of the solid-state polymerization can be increased by increasing the flow rate of the inert gas. However, even when the flow rate of the inert gas is increased to higher than 50 liters(N.T.P.)/hour, per gram of the granular form of prepolymer, the rate of the solid-state polymerization is no longer increased. Therefore, it is not necessary that the flow rate of the inert gas be increased to higher than 50 liters(N.T.P.)/hour, per gram of the granular form of prepolymer. From the standpoint of the improvement of the polymerization degree, the flow rate of the inert gas is preferably in the range of from 0.2 to 30 liters (N.T.P.)/hour, per gram of the granular form of prepolymer.

As in the case of the production of a powder form or an agglomerated powder form of polycarbonate, it is preferred that the condensation polymerization by-products be removed from the discharged inert gas, or the discharged inert gas be diluted with an inert gas, so that the resultant gas has a condensation polymerization by-products content of 5 mmHg or less in terms of the partial pressure of the condensation polymerization by-products in the inert gas, and the resultant gas be flowed into the heating zone as the inert gas.

The granular form of porous, crystallized, aromatic polycarbonate produced by the above-mentioned method of the present invention comprises terminal hydroxyl groups and/or terminal aryl carbonate groups, and has a number average molecular weight of from 6,000 to 200,000 and a crystallinity of from 35 to 70%, which are, respectively, greater than those of the granular form of prepolymer. In this connection, it is preferred that the crystal-linity of the granular form of porous, crystallized, aromatic polycarbonate be not greater than 70%. Further, it is also preferred that the specific surface area of the granular polycarbonate be at least 0.1 m$^2$/g.

The granular form of porous, crystallized, aromatic polycarbonate thus produced from the granular, prepolymer has a compressive break strength of at least 10 kgf/cm$^2$ which is greater than that of the granular form of prepolymer. This fact is unexpected and surprising. It has been considered that the compressive break strength of the granular form of polycarbonate is lower than that of the granular form of prepolymer. That is, it has been considered that the polymerization by-products, such as phenols and diaryl carbonate, are removed during the solid-state condensation polymerization, and by the removal of the by-products contained in the prepolymer, voids would be likely to be formed in the produced polycarbonate, which would result in a decrease in mechanical strength of the resultant polycarbonate.

The granular form of porous, crystallized, aromatic polycarbonate has substantially the same shape and diameter as those of the granular form of porous, crystallized, aromatic polycarbonate prepolymer which is used as a starting material. Therefore, the granular polycarbonate, generally, has a shape of a pellet, sheet, disk, cylinder, polygonal pillar, cube, rectangular parallelepiped or sphere, and has a diameter of 0.5 to 30 mm.

The powder form, the agglomerated powder form or the granular form of porous, crystallized, aromatic polycarbonate comprising recurring aromatic carbonate units and terminal hydroxyl and/or aryl carbonate groups and having a specific surface area of at least 0.1 m$^2$/g, a number average molecular weight of from 6,000 to 200,000 and a crystallinity of at least 35%, may be subjected to molding at a temperature lower than the glass transition temperature of the polycarbonate, to thereby obtain a shaped, porous, crystallized, aromatic polycarbonate. The thus obtained shaped polycarbonate has a bulk density of from 0.1 to 1.1 g/cm$^3$ and a compressive break strength of at least 10 kgf/cm$^2$. Therefore, according to the present invention, there is provided a method for producing a shaped, porous, crystallized aromatic polycarbonate having a bulk density of from 0.1 to 1.1 g/cm$^3$ and a compressive break strength of at least 10 kgf/cm$^2$, which comprises subjecting a powder form, an agglomerated powder form or a granular form of porous, crystallized aromatic polycarbonate to molding at a temperature which is lower than the glass transition temperature of the polycarbonate, the powder form, the agglomerated form or the granular form of porous, crystallized, aromatic polycarbonate comprising recurring aromatic carbonate units and terminal hydroxyl and/or aryl carbonate groups and having a specific surface area of at least 0.1 m$^2$/g, a number average molecular weight of from 6,000 to 200,000 and a crystallinity of at least 35%.

In the above-mentioned method of the present invention, the molding of the porous, crystallized aromatic polycarbonate may generally be conducted by compression molding or by extrusion molding at a temperature lower than glass transition temperature of the polycarbonate.

The powder form or agglomerated powder form of the porous, crystallized, aromatic polycarbonate of the present invention is not hydrolyzed during the molding, even when the polycarbonate is subjected to molding without drying the polycarbonate before molding. This is due to its extremely small equilibrium moisture content which is ascribed to its high crystallinity. Accordingly, the powder form or the agglomerated powder form of porous, crystallized, aromatic polycarbonate also can advantageously be subjected to conventional molding method, such as rotational molding and sinter molding, to prepare a shaped article.

A shaped polycarbonate can also be produced by heating the porous, crystallized, aromatic polycarbonate of the present invention. That is, according to the present invention, there is provided a method for producing a shaped, porous, crystallized aromatic polycarbonate having a bulk density of from 0.1 to 1.1 g/cm$^3$ and a compressive break strength of at least 10 kgf/cm$^2$, which comprises heating particles of a powder form or of an agglomerated powder form of porous, crystallized aromatic polycarbonate, or heating granules of a granular form of porous, crystallized aromatic polycarbonate, at a temperature which is higher than the glass transition temperature of the polycarbonate and which is lower than the crystalline melting temperature of the polycarbonate, to fuse and bond the surfaces of the particles or of the granules, the powder form, the agglomerated powder form or the granular form of porous, crystallized aromatic polycarbonate comprising recurring aromatic carbonate units and terminal hydroxyl and/or aryl carbonate groups and having a specific surface area of at least 0.1 m$^2$/g, a number average molecular weight of from 6,000 to 200,000 and a crystallinity of at least 35%. In this method, the heating of the particles of the powder form or the agglomerated powder form of porous, crystallized aromatic polycarbonate or the heating of the granular form of porous, crystallized aromatic polycarbonate is conducted at a temperature which is higher than the glass transition temperature of the polycarbonate and which is lower than the crystalline melting point of the polycarbonate. Generally, the heating may be conducted at 160° to 250° C. under a compressive load at 0.1 to 2 tf cm$^2$.

By the above mentioned method, a shaped article having excellent properties as will be described later can be obtained. Therefore, according to the present invention, there is provided a shaped, porous, crystallized aromatic polycarbonate comprising recurring aromatic carbonate units and terminal hydroxyl and/or aryl carbonate groups, and having a number average molecular weight of from 6,000 to 200,000, a bulk density of from 0.1 to 1.1 g/cm$^3$, a crystallinity of at least 35% and a compressive break strength of at least 10 kgf/cm$^2$.

In this connection, it is preferred that the shaped article have a specific surface area of at least 0.1 m$^2$/g. Further, it is also preferred that the crystallinity of the shaped polycarbonate be not greater than 70%.

The shaped, porous, crystallized aromatic polycarbonate may be in any form, e.g., a shape of a granule, pellet, sheet, disc, cylinder, polygonal pillar, cube, rectangular parallelepiped or sphere.

Each of the powder form or agglomerated powder form of porous, crystallized, aromatic polycarbonate, the granular form of porous, crystallized, aromatic polycarbonate and the shaped, porous, crystallized, aromatic polycarbonate of the present invention has a high, sharp crystalline melting point as well as a high crystallinity. These properties clearly distinguish the aromatic polycarbonate of the present invention and the shaped article thereof from the aromatic polycarbonate produced by the conventional phosgene process or melt process (transesterification process) mentioned hereinbefore. Such a high crystallinity of each of the porous, crystallized aromatic polycarbonate and the shaped article thereof of the present invention is presumed to be ascribed to the re-arrangement of the molecular chains of the porous, crystallized prepolymer, which is caused during the solid-state condensation polymerization. The crystalline melting point of the aromatic polycarbonate of the present invention is determined, using 5 to 10 mg of a polycarbonate sample, by means of a differential scanning calorimeter (hereinafter referred to as "DSC") in an atomosphere of an inert gas at a heating rate of 10°

C./min. For example, in the case of the aromatic polycarbonate produced using bisphenol A, the peak of the crystalline melting point is at 230° to 300° C., and the half width of the peak of the crystalline melting point is 3° to 8° C.

The porous, crystallized, aromatic polycarbonate of the present invention and the shaped article produced therefrom, both of which have high crystallinity, is excellent in resistance to chemicals and solvent as compared to the conventional amorphous aromatic polycarbonate. Therefore, the crystallized aromatic polycarbonate can advantageously be used as a sintering material, filter, absorbent of a gas or a liquid, wall covering material and heat insulating material, and may have various shapes, for example, a pellet, sheet, disk, cylinder, polygonal pillar cube, rectangular pallalelepiped or sphere.

Following is a chart showing the relationships between aromatic polycarbonate prepolymers and polycarbonates produced therefrom.

and, then, a transesterification is performed between the oligomer and an aromatic dihydroxy compound.

Method (3): an aromatic dihydroxy compound and a diaryl carbonate are reacted with each other in a molar ratio of from 1.2:1 to 2:1 to prepare an aromatic polycarbonate oligomer containing terminal groups comprised mainly of hydroxyl groups and having a number average molecular weight of about 350 to 950 and, then, a transesterification is performed between the oligomer and a diaryl carbonate.

Method (4): an aromatic dihydroxy compound and phosgene are subjected to interfacial condensation polymerization in the presence of a molecular weight controller.

Method (5): an aromatic dihydroxy compound is subjected to interfacial condensation polymerization together with phosgene and an aromatic monohydroxy compound (molecular weight controller) in excess amounts relative to the amount of the aromatic dihydroxy compound, to prepare an aromatic carbonate

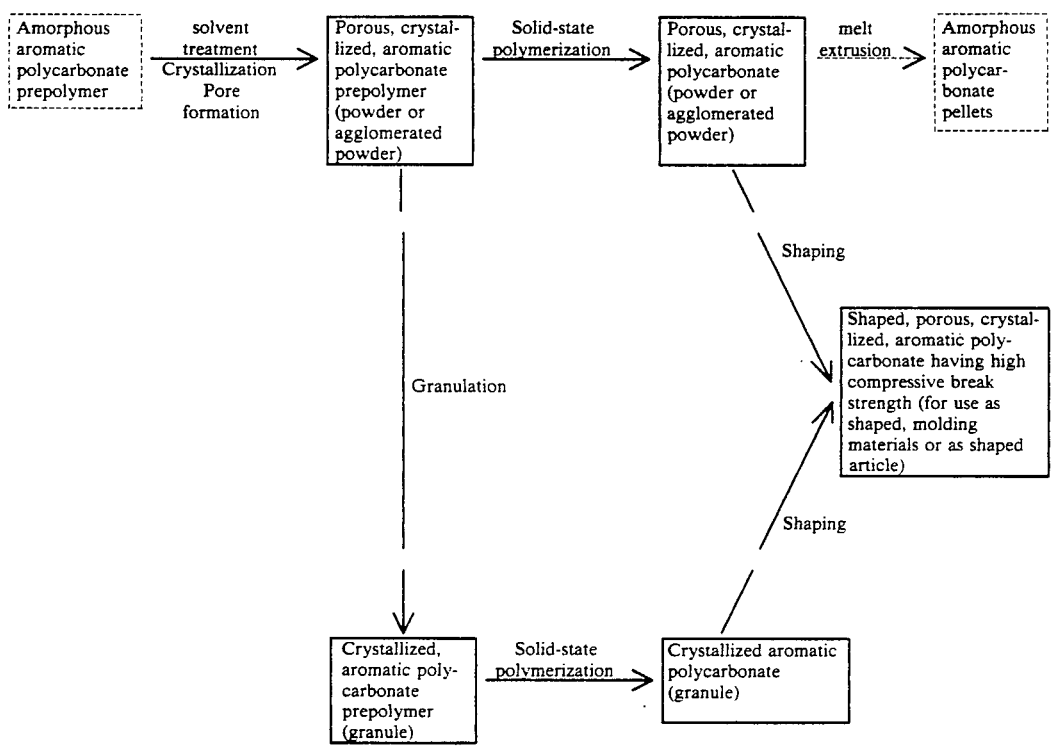

Hereinbelow, an explanation is given with respect to the preparation of an amorphous, aromatic polycarbonate prepolymer which is used as a starting material for producing a porous, crystallized, aromatic polycarbonate prepolymer of the present invention. The method for preparing the amorphous prepolymer is not specifically restricted. Generally, the following methods may be used.

Method (1): a transesterification is performed between an aromatic dihydroxyl compound and a diaryl carbonate.

Method (2): an aromatic dihydroxy compound and a diaryl carbonate are reacted with each other in a molar ratio of from 1:1.2 to 1:2 to prepare an aromatic polycarbonate oligomer containing terminal groups comprised mainly of aryl carbonate groups and having a number average molecular weight of about 350 to 950 oligomer containing terminal groups comprised mainly of aryl carbonate groups and having a number average molecular weight of about 350 to 950 and, then, a transesterification is performed between the oligomer and an aromatic dihydroxy compound.

By any of Method (1), (2) and (3), an amorphous aromatic polycarbonate prepolymer containing substantially no chlorine compound can easily be produced advantageously. From such an amorphous aromatic polycarbonate prepolymer, a porous, crystallized, aromatic polycarbonate prepolymer and a porous, crystallized aromatic polycarbonate, each containing substantially no chlorine compound, can advantageously be produced.

On the other hand, according to Method (4) or (5) in which phosgene is used, each of the obtained aromatic polycarbonate prepolymer which is a final product of each of Methods (4) and (5) and the aromatic polycarbonate oligomer which is an intermediate product, contains a chlorine compound. However, when each of the aromatic polycarbonate prepolymer and the oligomer has a relatively low molecular weight, the chlorine compound can easily be removed from each of the prepolymer and the oligomer. Therefore, even according to Method (4) or (5), an aromatic polycarbonate having a lower molecular weight and containing substantially no chlorine compound can easily be obtained.

The aromatic dihydroxy compound and the diaryl compound which may be used as raw materials for preparing an amorphous aromatic polycarbonate prepolymer is represented by formulae (IX) and (X):

HO—Ar—OH             (IX), wherein Ar has the same meaning as defined above; and

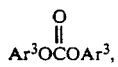

$$\underset{Ar^3OCOAr^3,}{\overset{O}{\underset{\|}{}}}\qquad (X)$$

wherein Ar³ has the same meaning as defined above.

Representative examples of diaryl carbonates include substituted or unsubstituted diphenyl carbonates represented by the formula:

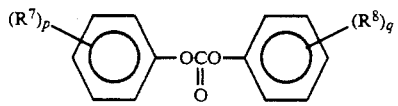

wherein each of R⁷ and R⁸ independently represents a hydrogen atom, a halogen atom, an alkyl group having 1 to 10 carbon atoms, an alkoxy group having 1 to 10 carbon atoms, a cycloalkyl group having from 5 to 10 ring carbon atoms or a phenyl group; and each of p and q independently represents an integer of from 1 to 5; with the proviso that when p is an integer of from 2 to 5, each R⁷ may be the same or different, and when q is an integer of from 2 to 5, each R⁸ may be the same or different.

Of these diphenyl carbonates, preferred are diaryl carbonates having a symmetrical configuration, such as diphenyl carbonate, ditolyl carbonate and diphenyl carbonate substituted with a lower alkyl group, e.g. di-t-butylphenyl carbonate. Of these, diphenyl carbonate is most preferred because of the simplest structure.

The above-mentioned diaryl carbonates are used individually or in combination. However, when two or more different types of diaryl carbonates are used, the reaction system becomes complicated with little advantage. Therefore, it is preferred to use one type of diaryl carbonate having a symmetrical configuration, individually.

As the molecular weight controller to be employed in the interfacial condensation polymerization method, there may be mentioned the aromatic monohydroxy compound represented by formula (XI):

Ar³—OH           (XI)

wherein Ar³ has the same meaning as defined above.

Preferable examples of aromatic monohydroxy compounds include phenol, o-, m- or p-cresol, 2,6-xylenol, p-t-butylphenol and p-octylphenols(including various position isomers). Of these, phenol and p-t-butylphenol are particularly preferred.

Further, another type of molecular weight controller may also advantageously be used in combination with the above-mentioned aromatic monohydroxy compound. Examples of molecular weight controllers of this type include monohydric alcohols, such as methanol and ethanol; haloformates, such as methyl chloroformate, ethyl chloroformate, isopropyl chloroformate and cyclohexyl chloroformate; monovalent thiols, such as methyl mercaptan and ethyl mercaptan; monovalent halothioformates, such as methyl chlorothioformate and ethyl chlorothioformate; monocarboxylic acid such as acetic acid, propionic acid, benzoic acid, sodium acetate, acetic anhydride and acetyl chloride, propionyl chloride and derivatives thereof.

In order to facilitate the pre-polymerization, a dibasic acid or a reactive derivative thereof may optionally be used in an amount of 5 mole % or less based on the number of moles of the aromatic dihydroxy compound. The above dibasic acid and reactive derivatives thereof may be aliphatic, aromatic or alicyclic. Examples of dibasic acids and reactive derivatives thereof include dibasic acids, such as terephthalic acid, isophthalic acid, phthalic acid, naphthalene-1,5-dicarboxylic acid, diphenyl-2,2'-dicarboxylic acid, cis-1,2-cyclohexane dicarboxylic acid, oxalic acid, succinic acid, sebacic acid, adipic acid, maleic acid and fumaric acid; and alkali metal salts, alkaline earth metal salts, amine salts and halides thereof.

An explanation is given below with respect to preferred modes of the method of the present invention for producing a porous, crystallized aromatic polycarbonate. Examples of preferred modes include the following methods (A), (B) and (C).

Method (A) for producing a porous, crystallized, aromatic polycarbonate from an aromatic dihydroxy compound and diaryl carbonate comprises the steps of:

(1) reacting an aromatic dihydroxy compound with an aromatic carbonate under heating at a temperature sufficient and for a period of time sufficient to prepare an amorphous prepolymer having a number average molecular weight of from 1,000 to 15,000 and having terminal hydroxyl and aryl carbonate groups (prepolymerization);

(2) treating the amorphous prepolymer with solvent under sufficient shearing force to crystallize to a crystallinity of at least 5% and simultaneously render porous the prepolymer, the shearing force being sufficient to cause the resultant powder form of porous, crystallized, aromatic polycarbonate prepolymer to have an average particle diameter of 250 μm or less, the resultant powder form of porous, crystallized prepolymer having a specific surface area of at least 0.2 m²/g; and (3) heating the powder form of porous, crystallized prepolymer, or heating an agglomerated powder form or a granular form of porous, crystallized prepolymer derived from the powder form of prepolymer, at a temperature which is higher than the glass transition temperature of the crystallized prepolymer and at which the crystallized prepolymer is in a solid state, to effect solid-state condensation polymerization of the crystallized prepolymer, thereby increasing the number average molecular weight and the crystallinity of the crystallized prepolymer to from 6,000 to 200,000 and at least 35%, respectively, so that the resultant polycarbonate has a number average molecular weight and a crystallinity which are, respectively, greater than those of the crystallized prepolymer.

In method (A), an amorphous prepolymer is prepared in the pre-polymerization step (1) and then crystallized and rendered porous in step (2). Subsequently, the porous, crystallized, prepolymer obtained in Step (2) is subjected to solid-state condensation polymerization in step (3). In prepolymerization step (1), a mixture of an aromatic dihydroxy compound and a diaryl carbonate is heated, while removing a by-produced aromatic monohydroxy compound having a structure such that a hydroxyl group is bonded to an aryl group derived from the diaryl carbonate, to thereby obtain a prepolymer.

The number average molecular weight of the amorphous prepolymer prepared in pre-polymerization step (1) is generally within the range of from 1,000 to 15,000. The number average molecular weight of the amorphous prepolymer can be controlled by appropriately selecting reaction conditions, such as temperature, reaction time, pressure and agitation rate. In general, the pre-polymerization is performed at a temperature of from 100° to 320° C., preferably of from 160° to 280° C., for a period of from 0.5 to 20 hours under atmospheric pressure or reduced pressure.

The pre-polymerization is preferably effected in molten state without using a solvent. Alternatively, the pre-polymerization may be performed in a solvent which is inert to the pre-polymerization reaction, such as methylene chloride, chloroform, 1,2-dichloroethane, tetrachloroethane, dichlorobenzene, tetrahydrofuran, diphenylmethane and diphenyl ether.

The molar ratio of the diaryl carbonate to the aromatic dihydroxy compound is varied depending on the types of the employed diaryl carbonate and aromatic dihydroxy compound, the reaction conditions, such as reaction temperature. The diaryl carbonate may be used in an amount of from 0.6 to 1.8 moles, preferably from 0.7 to 1.6 moles, more preferably from 0.8 to 1.5 moles, per mole of the aromatic dihydroxy compound.

The amorphous prepolymer prepared in the above-mentioned pre-polymerization generally comprises terminal aryl carbonate groups represented, for example, by the formula:

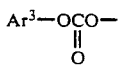

wherein $Ar^3$ has the same meaning as defined above, and terminal hydroxyl groups derived from the dihydroxydiaryl compound, which is represented, for example, by the formula:

wherein Ar has the same meaning as defined above.

The crystallization and pore formation in step (2) and the solid-state condensation polymerization in step (3) are conducted in the same manner as described hereinbefore in detail.

Method (B) for producing a crystallized aromatic polycarbonate from an aromatic dihydroxy compound and phosgene comprises the steps of:

(1) reacting an aromatic dihydroxy compound with phosgene in the presence of a molecular weight controller to prepare a prepolymer having a number average molecular weight of from 1,000 to 15,000 (pre-polymerization);

(2) treating said prepolymer with solvent under sufficient shearing force to crystallize to a crystallinity of at least 5% and simultaneously render porous said prepolymer, the shearing force being sufficient to cause the resultant powder form of porous, crystallized, aromatic polycarbonate prepolymer to have an average particle diameter of 250 μm or less, the resultant powder form of porous, crystallized prepolymer having a specific surface area being at least 0.2 m²/g; and (3) heating the powder form of porous, crystallized prepolymer, or heating an agglomerated powder form or a granular form of porous, crystallized prepolymer derived from the powder form of prepolymer, at a temperature which is higher than the glass transition temperature of the crystallized prepolymer and at which the crystallized prepolymer is in a solid state, to effect solid-state condensation polymerization of the crystallized prepolymer, thereby increasing the number average molecular weight and the crystallinity of the crystallized prepolymer to from 6,000 to 200,000 and at least 35%, respectively, so that the resultant polycarbonate has a number average molecular weight and a crystallinity which are, respectively, greater than those of the crystallized prepolymer.

In method (B), the pre-polymerization in step (1) may be conducted by a conventional method in which an aromatic dihydroxy compound is reacted with phosgene in the presence of the above-mentioned molecular weight controller, an acid acceptor and a solvent. Preferred examples of acid acceptors include an aqueous alkali solution containing 5 to 10% by weight of an alkali, and a tertiary amine, such as pyridine. Examples of solvents include methylene chloride, chloroform, carbon tetrachloride, tetrachloroethylene, chlorobenzene and xylene.

It is preferred that phosgene be added to the reaction system by blowing the phosgene in gaseous form into a mixture of an aromatic dihydroxy compound, an acid acceptor, a molecular weight controller and a solvent (particularly preferred is methylene chloride), or by dissolving phosgene in a solvent and dropping the solution into the mixture of an aromatic dihydroxy compound and an acid acceptor. The molecular weight controller may be added before, during or after the reaction of phosgene with an aromatic dihydroxy compound, but it is preferred that the molecular weight controller be added before or during the reaction. The reaction temperature is generally in the range of from −30° to 100° C. and the reaction time is generally in the range of from 1 minute to 10 hours.

The prepolymer prepared by the pre-polymerization in step (1) has a number average molecular weight of 1,000 to 15,000. This molecular weight can be attained by appropriately selecting reaction conditions, such as the amount of a molecular weight controller, the amount of aqueous alkali solution, the reaction temperature and the rate of the addition of phosgene. The prepolymer prepared by the pre-polymerization generally comprises terminal chloroformate groups (—ArO-COCl) and terminal alkali metal-containing phenolate groups (such as —ArONa), in addition to aryl carbonate groups and hydroxyl groups derived from the aromatic monohydroxy compound used as a molecular weight controller. The terminal chloroformate groups can be converted to terminal hydroxyl groups by completely hydrolyzing the terminal chloroformate groups into phenolate groups by treatment with an aqueous alkaline solution, and nutralizing the resultant alkali metal-containing phenolate groups with an acid solution, followed by washing with pure water. In the case where a monohydric alcohol, such as ethanol, or a chloroformate of a monohydric alcohol, such as ethyl chloroformate, is used as a molecular weight controller in combination with an aromatic monohydroxy compound, the terminal groups of the prepolymer are generally comprised of aryl carbonate groups, alkyl carbonate groups, and hydroxyl groups. Preferred is a porous, crystallized aromatic polycarbonate having its terminal groups comprised substantially of hydroxyl groups and aryl carbonate groups.

The prepolymer obtained by the pre-polymerization in step (1) is generally in the form of a solution of the prepolymer in the organic solvent. The method for obtaining a solid prepolymer from the solution is not specifically restricted. For example, the prepolymer solution is well washed and neutralized, and then, (i) the solution is concentrated to dryness, followed by pulverization, or the solution is concentrated to a wet mass, followed by pulverization and drying, to obtain a solid; or (ii) the solution is heated while vigorously stirring and blowing steam to distill off the solvent.

The solid prepolymer obtained by the above method may have already been partly crystallized. However, the prepolymer has not yet be rendered porous and, therefore, its specific surface area is generally as small as 0.1 m$^2$/g or less. In order to prepare the porous, crystallized, aromatic polycarbonate prepolymer of the present invention from the thus obtained solid prepolymer, the solid prepolymer as such or in a molten state is introduced into a solvent and treated with the solvent under sufficient shearing force to crystallize and render porous the amorphous aromatic polycarbonate prepolymer as described above. That is, the prepolymer is treated under shearing force which is sufficient to cause the resultant powdery, porous, crystallized, aromatic polycarbonate prepolymer to have an average particle diameter of 250 μm or less.

Examples of solvents to be used for treating the prepolymer include acetone, methyl ethyl ketone, methyl propyl ketone, xylene, ethyl acetate, acetonitrile and toluene. Of these, acetone is preferred.

The solid-state polymerization in step (3) is conducted as described hereinbefore in detail. With respect to the solid-state polymerization, it is believed that when the terminal groups of the prepolymer are comprised not only of terminal phenyl carbonate groups and terminal hydroxyl groups, but also alkyl carbonate groups, such as ethyl carbonate groups, not only advances the condensation polymerization reaction of the prepolymer while releasing phenol and diphenyl carbonate, but also the polycondensation reaction advances while releasing phenyl ethyl carbonate.

Method (C) for producing a crystallized aromatic polycarbonate from an aromatic polycarbonate oligomer and an aromatic dihydroxy compound comprises the steps of:

(1) reacting an aromatic polycarbonate oligomer having a number average molecular weight of from about 350 to about 950 and having its terminal groups comprised substantially of aryl carbonate groups with an aromatic dihydroxy compound under heating at a temperature sufficient and for a period of time sufficient to prepare an amorphous prepolymer having a number average molecular weight of from 1,000 to 15,000 and having terminal hydroxyl and aryl carbonate groups;

(2) treating the amorphous prepolymer with solvent under sufficient shearing force to crystallize to a crystallinity of at least 5% and simultaneously render porous the prepolymer, the shearing force being sufficient to cause the resultant powder form of porous, crystallized, aromatic polycarbonate prepolymer to have an average particle diameter of 250 μm or less, the resultant powder form of porous, crystallized prepolymer having a specific surface area being at least 0.2 m$^2$/g; and (3) heating the powder form of porous, crystallized prepolymer, or heating an agglomerated powder form or a granular form of porous, crystallized prepolymer derived from the powder form of prepolymer, at a temperature which is higher than the glass transition temperature of the crystallized prepolymer and at which the crystallized prepolymer is in a solid state, to effect solid-state condensation polymerization of the crystallized prepolymer, thereby increasing the number average molecular weight and the crystallinity of the crystallized prepolymer to from 6,000 to 200,000 and at least 35%, respectively, so that the resultant polycarbonate has a number average molecular weight and a crystallinity which are, respectively, greater than those of the crystallized prepolymer.

In method (C), an aromatic polycarbonate oligomer having its terminal groups comprised substantially of aryl carbonate groups is used for the pre-polymerization in step (1). As described above, such an oligomer can easily be prepared by the transesterification method or the interfacial polycondensation method.

An agglomerated powder form or a granular form of porous, crystallized prepolymer, which may be used in step (3) of each of Methods (A), (B) and (C), can easily be obtained individually from the powder form of porous, crystallized prepolymer in the manner as described before in detail.

The crystallization in step (2) and the solid-state polymerization in step (3) are conducted in the same manner as described hereinbefore in detail.

In all the steps of each of the above methods, i.e., the pre-polymerization, the crystallization of the prepolymer and the solid-state polymerization, the reaction may be carried out in a batch-wise manner or in a continuous manner. Both the manners may be employed in combination.

The powder form, the agglomerated powder form or the granular form of porous, crystallized, aromatic polycarbonate prepolymer of the present invention can advantageously be used as a prepolymer to be subjected to solid-state polymerization to produce a polycarbonate. Further, the prepolymer itself can also be used as a raw material for producing a sintered product, a filter, an adsorbent and a coating composition, or can be mixed with other resins to prepare polymer alloys.

The powder form, the agglomerated form, or the granular form of porous, crystallized, aromatic polycarbonate of the present invention having a desired molecular weight, which is formed by the solid-state polymerization of the above-mentioned prepolymer, may be directly introduced into an extruder without cooling to pelletize it by melt-extrusion, thereby obtaining colorless, transparent pellets of a polycarbonate. Alternatively, the powder agglomerated powder form or granular form of porous, crystallized, aromatic polycarbonate may be cooled before introducing it into an extruder. Introduction of the polycarbonate into an extruder without cooling is advantageous from the viewpoints of energy saving in extrusion and increase of the extrusion rate of the extruder. Further, the granular form of polycarbonate has satisfactorily high bulk density. Therefore, the granular form of polycarbonate can be directly subjected to injection molding or extrusion molding without being pelletized by melt-extrusion. Pelletization of a polycarbonate by melt-extrusion not only needs much energy but also leads to a lowering of the quality of the aromatic polycarbonate due to heat deterioration. In the case of the granular form of polycarbonate, pelletization can advantageously be omitted.

According to the present invention, a wide variety of aromatic polycarbonates, including not only aromatic polycarbonate having a broad molecular weight distribution, but also aromatic polycarbonate having a narrow molecular weight distribution, can be provided. When a prepolymer having a narrow molecular weight distribution is used, an aromatic polycarbonate having a narrow molecular weight distribution can be obtained. On the other hand, when a prepolymer having a broad molecular weight distribution is used, an aromatic polycarbonate having a broad molecular weight distribution can be obtained. This is one of the remarkable features of the present invention. As a criterion of the molecular weight distribution, a ratio of a weight average molecular weight (Mw) to a number average molecular weight (Mn), i.e., Mw/Mn, is generally used. With respect to a polymer prepared by a condensation polymerization reaction, there has been established a theory that, when the Mw/Mn is 2, the polymer has the narrowest molecular weight distribution. From the viewpoint of the properties of the polymer, such as flowability in molding, mechanical strength and elongation, it is preferred that a polymer have a narrow molecular weight distribution. However, it is practically difficult to prepare a polymer having an Mw/Mn of 2.5 or less, particularly not 2.4 or less. In the conventional polymerization methods, such as the transesterification method which is known as a melt process, a polymerization reaction system becomes very viscous before completion of the polymerization reaction, so that the polymerization reaction does not advance uniformly. According to this conventional method, it is infeasible to obtain an aromatic polycarbonate having a narrow molecular weight distribution. The aromatic polycarbonate obtained by the conventional transesterification method generally has an Mw/Mn of more than 2.6. In the conventional phosgene process which is frequently carried out on a commercial scale, the obtained aromatic polycarbonate has an Mw/Mn of from 2.4 to 3.5, generally from 2.5 to 3.2. In contrast, an aromatic polycarbonate having an Mw/Mn as low as from 2.2 to 2.5 can easily be prepared by the method of the present invention. The reason for this is believed to be that in the stage of producing a prepolymer which has a relatively low molecular weight, a prepolymer having a narrow molecular weight distribution can easily be obtained and such a prepolymer having a narrow molecular weight distribution is used for producing the polycarbonate.

The porous, crystallized, aromatic polycarbonate of the present invention, for example, a porous, crystallized, polycarbonate prepared using bisphenol A, which is one of the most preferred polycarbonates of the present invention, is white and opaque. However, when this porous, crystallized, aromatic polycarbonate is heated to a temperature higher than its crystalline melting point or subjected to melt molding, an amorphous aromatic polycarbonate having good transparency can be obtained. This also is an important feature of the aromatic polycarbonate of the present invention. When an aromatic polycarbonate is prepared from bisphenol A and diphenyl carbonate by the conventional melt process, it is necessary to react highly viscous raw materials with each other under severe conditions, that is, at a high temperature, i.e., about 300° C., under highly reduced pressure, i.e., 1 mmHg or less, for a prolonged period of time. Consequently, the obtained polycarbonate inevitably assumes a light yellow color due to the thermal decomposition of the polymer or due to the oxidation of the polymer by the action of a small amount of oxygen present in the reaction system. In contrast, according to the present invention, not only can the pre-polymerization be performed at a relatively low temperature, i.e., 250° C. or less, preferably 240° C. or less, in a short period of time even when the transesterification method is employed, but also both the treatment for crystallization and pore formation and the solid-state polymerization can be performed at a relatively low temperature, i.e., 230° C. or less. Consequently, in the method of the present invention, there is no danger of deterioration of the polymer, differing from the case of the conventional melt process, such as the conventional transesterification process.

The porous, crystallized, aromatic polycarbonate of the present invention may optionally be mixed with various additives such as heat stabilizers, antioxidants, mold release agents, fire retardants and various inorganic fillers such as glass fibers, and the resultant composition used in a wide variety of fields, such as a engineering plastics field. Moreover, the porous, crystallized, aromatic polycarbonate of the present invention can advantageously be kneaded with another polymer in order to form a polymer alloy. Therefore, the porous, crystallized, aromatic polycarbonate is particularly useful as a raw material for the production of a polymer alloy on a commercial scale.

An aromatic polycarbonate containing no chlorine atom can be obtained in the present invention. The aromatic polycarbonate containing no chlorine atom is extremely useful as a material for an optical instrument and a material for electronic equipment.

Further, according to the present invention, it is possible to produce not only an ultra-high molecular weight polycarbonate having a number average molecular weight of 15,000 or more by solid-state polymerization, which is difficult or impossible to produce by the conventional phosgene method or the conventional transesterification method (melt method), but also a polycarbonate having reactive hydroxyl groups at its terminals.

As aforedescribed, in the conventional phosgene process for producing an aromatic polycarbonate on a commercial scale, by-products including chlorine and electrolytes, such as sodium chloride, are formed as impurities. These impurities are disadvantageously and inevitably contained in the final polycarbonate. Further, a chlorine-containing compound, such as methylene chloride, which is used as a solvent in a large amount, is also likely to be contained as an impurity in the polycarbonate. Such impurities adversely affect the properties of the final polycarbonate. Conventionally, in order to decrease the amount of impurities contained in the final polycarbonate, washing and other operations have been conducted. However, thse operations are troublesome and expensive, and it is infeasible to remove impurities completely from the resin.

By contrast, according to the present invention, even in the mode in which the use of phosgene is involved, the product which is obtained directly from phosgene is a prepolymer having a relatively low molecular weight, and such a prepolymer can easily be treated for removing impurities (such as chlorine-containing compound) therefrom. Therefore, the aromatic polycarbonate of the present invention is completely free from such impurities and hence excellent in quality. Moreover, naturally, any troublesome process for removing impurities from the final polycarbonate is not required. Accordingly, the method of the present invention is commercially advantageous.

Further, in the conventional transesterification melt process, an expensive reactor is disadvantageously required for attaining a reaction under high viscosity, high temperature and high vacuum conditions. Therefore, due to the high temperature, the polymer is likely to be deteriorated. By contrast, according to the method of the present invention, such a special reactor is not required, and the aromatic polycarbonate produced by the method of the present invention has excellent properties as described above.

The powder form, the agglomerated powder form or the granular form of porous, crystallized, aromatic polycarbonate prepolymer can be polymerized at extremely high reaction rate by solid-state polymerization, without the danger of adhesion of the prepolymer to the inner wall of the reactor and adhesion between prepolymer particles. Thus, the present invention is extremely useful for providing an aromatic polycarbonate, which can easily, efficiently be produced by solid-state polymerization on a commercial scale.

BEST MODE FOR CARRYING OUT THE INVENTION

The present invention will be described in more detail with reference to the following Examples, which should not be construed as limiting the scope of the present invention.

In the present invention, the molecular weight is expressed in terms of a number average molecular weight (hereinafter referred to simply as "Mn") and a weight average molecular weight (hereinafter referred to simply as "Mw") as measured by gel permeation chromatography (GPC). For reference, the molecular weight of TOUGHLO ® A 2500 (registered trademark of a polycarbonate manufactured and sold by Idemitsu Sekiyukagaku K.K., Japan) is measured and found to have an Mn of 10,700 and an Mw of 28,000.

The molar ratios with respect to terminal groups in a prepolymer and a polycarbonate after solid-state condensation polymerization are determined by high-performance liquid chromatography or by nuclear magnetic resonance (NMR) spectroscopy.

The specific surface area is determined by measuring the surface area of a sample by means of AC-CUSORBR ®-2100-02 (manufactured and sold by Shimadzu Corp., Japan) using krypton gas, and dividing the measured surface area by the weight of the sample.

The average particle diameter of a prepolymer in a solvent for crystallization is determined by taking an aliquot from a uniformly mixed slurry of the prepolymer, diluting the aliquot with the solvent, applying a ultrasonic wave to the diluted aliquot to disperse the prepolymer in the solvent, casting the resultant dispersion on a glass plate, drying the dispersion to deposit the prepolymer on the glass plate and measuring the particle diameter of the deposited prepolymer using a microscope.

The particle size distribution of dry particles is determined by classifying particles into fractions respectively remaining on 1,070 $\mu$m screen, 850 $\mu$m screen, 600 $\mu$m screen, 250 $\mu$m screen, 150 $\mu$m screen, 75 $\mu$m screen and 50 $\mu$m screen and a fraction passing through 50 $\mu$m screen by means of micro-type magnetic vibration screen classifier model M-2 (manufactured and sold by Tsutsui Rikagaku Kiki, Japan), and measuring the weight of each of the fractions.

The crystallinity is measured by the X ray diffractometry as described hereinbefore.

In Examples 18 to 24, the compressive break strength of a granular prepolymer and a granular polycarbonate after solid-state condensation polymerization is determined as follows. That is, using, for example, a Kiya type hardness meter, a compressive force is applied between opposite surfaces of a sample, which each have an area of at least about 1 mm$^2$ and are apart from each other substantially in parallel relationship at a distance of about 1 mm. The load for application of a compressive force is increased until the sample breaks. The load (kgf/cm$^2$) at which the sample breaks is referred to simply as the load at break. The measurement of the load at break is conducted 10 times. When a sample prepolymer or polycarbonate does not have two surfaces which are apart from each other substantially in parallel relationship, a sample having such opposite surfaces is cut out from the original sample, followed by measurement of compressive break strength in the manner described above. From the 10 values of load at break thus obtained, the maximum and minimum values are omitted, and the average of the remaining 8 values is calculated. The compressive break strength is represented by the calculated average value.

In Examples 33 and 34, the compressive break strength (kgf/cm$^2$) is measured using an Instron type universal tester.

The partial pressure of phenol in a phenolsaturated nitrogen gas used in solid-state condensation polymerization is determined from the vapor pressure of phenol calculated according to the following formula shown on page 128 of Kagaku Binran II (Handbook of Chemistry) (published in 1984 by Maruzen Co., Japan).

$$\log P = 7.13457 - \frac{1516.072}{174.569 + t}$$

[wherein P represents a vapor pressure of phenol (mmHg) and t represents a temperature (° C.)].

In the following Examples, porous, crystallized, aromatic polycarbonate prepolymer is often referred to simply as "porous, crystallized prepolymer"; amorphous, aromatic, polycarbonate prepolymer is often referred to simply as "amorphous prepolymer"; porous, crystallized, aromatic polycarbonate is often referred to simply as "porous, crystallized polycarbonate"; shaped, porous, crystallized, aromatic polycarbonate is often referred to simply as "shaped, porous, crystallized polycarbonate"; and granular, porous, crystallized, aromatic polycarbonate is often referred to simply as "granular, porous, crystallized polycarbonate".

Example 1

13.0 kg of 2,2-bis(4-hydroxyphenyl)propane (hereinafter referred to as "bisphenol A") and 13.4 kg of diphenyl carbonate are charged into a 40 l glass-lined reactor provided with a stirrer, a gas inlet and a gas outlet. The resultant mixture is melted by heating to 180° C. and degassing is conducted under reduced pressure, followed by heating to 230° C. over a period of 3 hours. During the the temperature elevation, nitrogen gas is flowed through the reactor so that evaporated phenol is discharged from the reactor. Simultaneously with the termination of the temperature elevation, introduction of nitrogen gas is terminated. Then, the pressure in the reactor is stepwise reduced to 1 mmHg over a period of 2 hours. During the period of the pressure reduction, by-produced phenol and diphenyl carbonate are continuously discharged from the reactor. The reaction is further continued for 2 hours under reduced pressure of 1 mmHg to obtain about 10 kg of an amorphous prepolymer having a number average molecular weight of 4,000 and a molar ratio of terminal hydroxyl groups to terminal phenyl carbonate groups of 33/67 [hereinafter referred to as "amorphous prepolymer (I)"]. About 10 kg of molten amorphous prepolymer (I) is extruded in a strand form at about 240° C. over a period of 1 hour through a die having 40 orifices of 1 mm in diameter into a Waring blender type acetone bath filled with 15 kg of acetone having a temperature of from 40° to 50° C. Simultaneously with the extrusion, the blender in the acetone bath is revolved at a rate as high as 1,000 rpm so that the extruded strand is drawn and stretched into a thin fiber. The thin fiber is dipped in the acetone bath, and exposed to strong shearing force by agitation, thereby being crystallized, rendered porous and reduced to particles. As a result, particles of a porous, crystallized prepolymer are formed. The thus formed particles in acetone have an average particle v diameter of 150 μm. Then, acetone is distilled off under reduced pressure while heating the acetone bath to dry the porous, crystallized prepolymer. The thus obtained porous, crystallized prepolymer is white and opaque. When the surface of the porous, crystallized prepolymer is observed by means of a scanning electron micrograph, it is confirmed that a large number of pores are present on the surface of the crystallized prepolymer [see FIG. 1 (3060×magnification)]. On the other hand, when a relatively large particle (about 800 μm in diameter) of the porous, crystallized prepolymer is broken with forceps and the resultant section of particle of the porous, crystallized prepolymer is observed by means of a scanning electron micrograph, it is confirmed that a large number of pores are also present on the section [see FIG. 2 (1020×magnification)]. For the purpose of comparison, melted amorphous prepolymer (I) is cooled to room temperature and the surface of the cooled amorphous prepolymer (I) is observed by means of a scanning electron micrograph. As a result, it is confirmed that the surface of the amorphous prepolymer (I) is smooth and has no pore [see FIG. 3 (4400×magnification)].

The above-obtained porous, crystallized prepolymer has a specific surface area of 1.5 m$^2$/g and a crystallinity of 28%.

10 kg of the porous, crystallized prepolymer is charged into a cylindrical, gas flow type reactor made of stainless steel (internal diameter: 60 cm, height: 1 m) which is provided, at its bottom portion, with a sintered filter having pores of from about 40 to about 50 μm in diameter and having a thickness of about 5 mm, and heated to 180° C., followed by solid-state condensation polymerization. During the solid-state condensation polymerization, heated nitrogen gas is uniformly introduced at a rate of 10 m$^3$(N.T.P.)/hr from the bottom portion of the reactor through the sintered filter, and discharged from the upper portion of the reactor. The temperature of the polymerization is regulated by controlling the temperature of the heated nitrogen gas. The temperature is elevated from 180° C. to 220° C. at a temperature elevation rate of 10° C./hr and then kept at 220° C. for 5 hours, thereby obtaining a porous, crystallized polycarbonate having an Mn of 13,000 and an Mw of 31,200. The porous, crystallized polycarbonate has a specific surface area of 0.8 m$^2$/g and a crystallinity of 45%. A DSC chart [obtained using a DSC analyzer (model DSC7 manufactured and sold by Perkin Elmer Co., U.S.A.); the ordinate of the chart indicates heat flow (mW) while the abscissa indicates temperature (°C.)] of the porous, crystallized polycarbonate is shown in FIG. 9, in which the peak exhibiting the melting point of the polycarbonate appears at 271° C. From the charat, it is found that the half-width is 4.3° C. To the obtained porous, crystallized polycarbonate is added 250 ppm of tris(nonylphenyl) phosphite as a heat stabilizer, and melt-extrusion is conducted at 280° C. to obtain a colorless, transparent, amorphous polycarbonate. When the amorphous polycarbonate is injection-molded at 300° C., no silver streak occurs. With respect to the color of the resultant shaped article, the L-value and b*-value measured using a color and color-difference meter Model CR-200b (Minolta Camera Co., Ltd., Japan) are 91.7 and 3.5, respectively, i.e., the shaped article is colorless and transparent.

EXAMPLE 2

10 kg of amorphous prepolymer (I) prepared in substantially the same manner as in Example 1 is melted and extruded at about 240° C. and then cooled with water. After the cooling, pelletization is conducted. The resultant amorphous pellets are pulverized using a plastics pulverizer (manufactured by Fritsch Co., West Germany) to obtain a powder having a diameter of 1 mm or less.

An acetone bath as used in Example 1 is filled with 15 kg of acetone and acetone is kept at 40° C. Into the acetone bath is gradually charged the above obtained powder over a period of 1 hour while stirring at the same rate as in Example 1, i.e., 1,000 rpm to effect crystallization and pore formation. The resultant porous, crystallized prepolymer in acetone has an average particle diameter of 180 μm. Then, acetone is distilled off in substantially the same manner as in Example 1 to dry the porous, crystallized prepolymer. The scanning electron micrographs with magnifications of 1020, 3060 and 6020, respectively, of the surface of the thus obtained porous, crystallized prepolymer are respectively shown in FIGS. 4 to 6. It is confirmed from FIGS. 4 to 6 that the porous, crystallized prepolymer has pores having substantially uniform diameters. The porous, crystallized prepolymer has a specific surface area of 1.2 m$^2$/g and a crystallinity of 26%.

The above-obtained porous, crystallized prepolymer is subjected to solid-state condensation polymerization in substantially the same manner as in Example 1 to obtain a porous, crystallized polycarbonate having an Mn of 12,500 and an Mw of 29,600. When the porous, crystallized polycarbonate is injection-molded in substantially the same manner as in Example 1, the same colorless and transparent shaped article having no silver streak as obtained in Example 1 is obtained.

EXAMPLE 3

10 kg of amorphous prepolymer pellets (about 2 mm in diameter, about 3 mm in length) prepared in substantially the same manner as in Example 2, without pulverization, are charged into an acetone bath filled with 15 kg of acetone over a period of 1 hour while stirring to effect crystallization. The resultant porous, crystallized prepolymer in acetone has an average particle diameter of 230 μm. Then, acetone is distilled off in substantially the same manner as in Example 1 to dry the porous, crystallized prepolymer. The thus obtained porous, crystallized prepolymer has a particle diameter larger than that of the porous, crystallized prepolymer obtained in Example 2 (whilst some portion of the porous, crystallized prepolymer maintains substantially the same size as that of the starting pellet). The porous, crystallized prepolymer is less white and assumes slight transparency, as compared to the porous, crystallized prepolymer obtained in Example 2. The porous, crystallized prepolymer has a specific surface area of 0.4 m$^2$/g and a crystallinity of 23%.

The porous, crystallized prepolymer is subjected to solid-state condensation polymerization in substantially the same manner as in Example 2 except that the period of time for which the temperature is kept at 220° C. is changed to 14 hours, thereby obtaining a porous, crystallized polycarbonate having an Mn of 13,000 and an Mw of 31,400. In this Example, a longer polymerization time is required than in Examples 1 and 2.

COMPARATIVE EXAMPLE 1

10 kg of amorphous prepolymer powder prepared in substantially the same manner as in Example 2 is dissolved in 100 l of methylene chloride and then, methylene chloride is distilled off at room temperature under reduced pressure. Then, the resultant powder is placed in a vacuum drier, and dried at 40° C. overnight to obtain a powder having a crystallinity of 25% and a specific surface area of 0.07 m$^2$/g. The crystallized prepolymer powder is subjected to solid-state condensation polymerization in substantially the same manner as in Example 1 except that polymers being formed are sampled 8 hours, 13 hours and 24 hours after the initiation of the polymerization at 220° C. From the measurement of the molecular weight of each of the samples, it is found that the number average molecular weight of the polycarbonate reaches 8,100, 8,900 and 9,200 at respective polymerization times of 8, 13 and 24 hours. No significant further increase is observed in the number average molecular weight of the polycarbonate, and the desired number average molecular weight, i.e., Mn=12,500 cannot be attained. Polycarbonate having an Mn of 12,500 corresponds to a commercially available aromatic polycarbonate resin of the grade classified as high viscosity grade. The process which cannot provide a polycarbonate having an Mn of 12,500, is commercially disadvantageous.

COMPARATIVE EXAMPLE 2

10 kg of amorphous prepolymer powder prepared in substantially the same manner as in Example 2 is placed in an atmosphere of tetrahydrofuran vapor-saturated nitrogen gas at about 40° C. for 24 hours to effect crystallization. The resultant crystallized prepolymer has a specific surface area of 0.05 m$^2$/g and a crystallinity of 20%.

The crystallized prepolymer is subjected to solid-state condensation polymerization in substantially the same manner as in Example 1 except that the period of time for which the temperature is kept at 220° C. is changed to 24 hours. As in Comparative Example 1, the number average molecular weight of the polycarbonate cannot be increased to a desired level. The obtained polycarbonate has an Mn of 8,800.

COMPARATIVE EXAMPLE 3

10 kg of 2,2-bis [(4-methyl carbonate)phenyl] propane is charged into the same reactor as used in Example 1, and stirred while introducing dry argon gas heated to 280° C. at a flow rate of 30 l(N.T.P.)/hr to effect reaction at 280° C. for 7 hours, thereby obtaining an amorphous prepolymer having an Mn of 1,700 and an Mw of 3,300. The prepolymer is treated with methylene chloride to effect crystallization, and then dried in substantially the same manner as in Comparative Example 1. Thereafter, the resultant crystallized prepolymer is subjected to solid-state condensation polymerization in substantially the same manner as in Example 1 except that polymers being formed are sampled 24 hours and 50 hours after the initiation of the polymerization at 220° C. From the measurement of the molecular weight of each of the samples, it is found that the number average molecular weight reaches 6,500 (Mw=16,800) and 7,100 (Mw=18,000) at respective polymerization times of 24 and 50 hours. The molecular weight of the polycarbonate cannot be increased to a desired level.

COMPARATIVE EXAMPLE 4

Polymerization for obtaining an amorphous prepolymer (pre-polymerization) is conducted in substantially the same manner as in Comparative Example 3, except that 3 g of dibutyltin oxide is used as a catalyst and that the polymerization temperature and polymerization time are changed to 250° C. and 6 hours, to obtain an amorphous prepolymer having an Mn of 3,100 and an Mw of 6,400. The amorphous prepolymer is crystallized with methylene chloride, and then dried in substantially the same manner as in Comparative Example 1. Then, the resultant crystallized prepolymer is subjected to solid-state condensation polymerization in substantially the same manner as in Example 1 except that polymers being formed are sampled 24 hours and 40 hours after the initiation of the polymerization at 220° C. From the measurement of the molecular weight of each of the samples, it is found that the number average molecular weight of the polycarbonate reaches 8,500 and 10,300 at respective polymerization times of 24 and 40 hours. When the polycarbonates having Mn's of 8 500 and 10,300 are individually injection-molded at 300° C. to prepare shaped articles, silver streaks markedly occur on each of the shaped articles, and the surface of each of the shaped articles has hazy, opaque portions.

EXAMPLE 4

10 kg of an amorphous polycarbonate prepolymer having a number average molecular weight of 3,900 and a molar ratio of terminal hydroxyl groups to terminal phenyl carbonate groups of 35/65, which is prepared in substantially the same manner as in Example 1 except that, in the polymerization step, the temperature is elevated to 250° C. and kept at 235° C. is melted by heating at about 240° C. and extruded in a thin strand form, over a period of 1 hour, into a Waring blender acetone bath filled with 12 kg of acetone having a temperature of 40° to 50° C. through a die having 40 orifices of 1 mm in diameter. Simultaneously with the extrusion, the acetone and the prepolymer are agitated with a stirrer provided with blades at a rate as high as 500 rpm to effect crystallization and pore formation while effecting reduction of the prepolymer to fine powder. The resultant acetone slurry of a porous, crystallized prepolymer is opaque, and it is found that a great number of fine particles are present in the acetone slurry. The thus formed particles in acetone have an average particle diameter of 180 μm. When the acetone slurry is allowed to stand, a porous, crystallized prepolymer precipitates so that the upper portion of the acetone solution becomes transparent. When a portion of the transparent upper portion is taken out and the acetone contained therein is distilled off, a polycarbonate oligomer having a number average molecular weight of 710 is obtained. From the amount of the portion taken out and the amount of the oligomer obtained, it is found that the oligomer is present in the acetone solution in an amount of 390 g per 12 kg of acetone.

The acetone slurry of the porous, crystallized prepolymer is heated while stirring to distill off the acetone, so that the porous, crystallized prepolymer is dried. The particle diameter distribution of the thus obtained porous, crystallized prepolymer is measured. A fraction of the porous, crystallized prepolymer which passes through 50 μm screen is 2.8% by weight, based on the weight of the porous, crystallized prepolymer, and fractions of the porous, crystallized prepolymer which remain on 50 μm screen, 75 μm screen, 150 μm screen, 250 μm screen, 600 μm screen, 850 μm screen and 1070 μm screen are respectively 3.4% by weight, 12.6% by weight, 11.7% by weight, 20.7% by weight, 26.8% by weight, 15.4% by weight and 6.5% by weight, based on the weight of the porous, crystallized prepolymer. Since the polycarbonate oligomer serves as an adhesive during the drying, agglomeration of the powder of the porous, crystallized prepolymer occurs to form secondary particles, leading to a large particle diameter. The porous, crystallized prepolymer has a specific surface area of 1.7 $m^2/g$ and a crystallinity of 29%.

9 5 kg of the porous, crystallized prepolymer (which has preliminarily been heated to 140° C.) is subjected to solid-state condensation polymerization using a 70 l tumbler type, solid-state condensation polymerization reactor made of a stainless steel. The solid-state condensation polymerization is conducted under conditions such that nitrogen gas is introduced little by little into the reactor while keeping the pressure at 1 to 2 mmHg using a vacuum pump and that the temperature is elevated from 140° C. to 180° C. over 30 minutes and further elevated from 180° C. to 220° C. at a rate of 10° C./hr, and then kept at 220° C. for 7 hours, thereby obtaining a porous, crystallized polycarbonate having an Mn of 11,500. There is observed no adhesion of the polycarbonate to the inner wall of tumbler, and observed almost no adhesion of the polycarbonate to a bag filter disposed between the tumbler and the vacuum pump. The porous, crystallized polycarbonate obtained by the solid-state condensation polymerization is melted, extruded and pelletized at 280° C. to obtain colorless, transparent pellets of an amorphous aromatic polycarbonate. The thus obtained pellets is injection-molded at 300° C. to obtain a plate. The plate exhibits a transmittance (according to ASTM D1003) of 90.4% and a haze (according to ASTM D1003) of 0.3%.

EXAMPLE 5

An acetone slurry of a porous, crystallized prepolymer obtained in substantially the same manner as in Example 4 is separated into the porous, crystallized prepolymer and an acetone solution by means of a batch type centrifugal separator. 9 kg of the thus obtained porous, crystallized prepolymer and a separately prepared 650 g of an acetone solution of a polycarbonate oligomer having an Mn of 850 (oligomer concentration: 30% by weight) are mixed well, and acetone is distilled off while heating and stirring, to obtain a dried, porous, crystallized prepolymer. The particle diameter distribution of the thus obtained porous, crystallized prepolymer is determined by classifying the particles into fractions by means of screens The major fraction is one containing the particles of the prepolymer having passed through the 600 μm screen. The amount of the prepolymer contained in the fraction having passed through the 50 μm screen is only 3 5% by weight, based on the total weight of the prepolymer The porous, crystallized prepolymer has a specific surface area of 1.5 $m^2/g$ and a crystallinity of 28%.

The porous, crystallized prepolymer is subjected to solid-state condensation polymerization in substantially the same manner as in Example 4 to obtain a porous, crystallized polycarbonate having Mn of 10,800, a specific surface area of 0.8 $m^2/g$ and a molar ratio of terminal hydroxyl groups to terminal phenyl carbonate groups of 4/96.

Neither adhesion of the polycarbonate to the inner wall of tumbler nor clogging of the bag filter with the polycarbonate is observed.

EXAMPLE 6

An amorphous prepolymer having a number average molecular weight of 5,100 and a molar ratio of terminal hydroxyl groups to terminal phenyl carbonate groups of 30/70 is prepared in substantially the same manner as in Example 1 except that the period of time for keeping the pressure at 1 mmHg is changed to 3 hours. The amorphous prepolymer is subjected to solid-state condensation polymerization in substantially the same manner as in Example 4 to obtain a porous, crystallized prepolymer having a specific surface area of 1.3 $m^2/g$. The particle diameter distribution of the thus obtained porous, crystallized prepolymer, which is determined by classifying of the particles into fractions by means of screens, is such that the major fraction is one containing the particles of the prepolymer having passed through the 850 μm screen. The amount of the particles contained in the fraction having passed through the 50 μm screen is 1.3% by weight, based on the total weight of the prepolymer.

The porous, crystallized prepolymer is subjected to solid-state condensation polymerization in substantially the same manner as in Example 4 except that the period of time for keeping the prepolymer at 220° C. is changed to 6 hours, thereby obtaining a porous, crystallized polycarbonate having Mn of 10,200, a crystallinity of 41%, a crystalline melting point of 262° C. and a specific surface area of 0.6 $m^2/g$. Neither adhesion of the polycarbonate to the inner wall of tumbler nor clogging of the bag filter with the polycarbonate is observed.

EXAMPLE 7

An aqueous solution prepared by dissolving 64.8 g of sodium hydroxide in 800 g of water, is mixed with 137 g of bisphenol A, 400 ml of methylene chloride and 1.7 g of phenol to prepare an emulsion. Into the emulsion is gradually blown 58.5 g of phosgene over a period of 1 hour while stirring and while maintaining the temperature at from 10° to 20° C., to advance a reaction. To the resultant reaction mixture is added 0.12 g of triethylamine, followed by stirring for 1 hour, thereby separate the mixture into a methylene chloride layer (a prepolymer solution in methylene chloride) and an aqueous layer. The methylene chloride layer is collected, and to the methylene chloride layer is added an aqueous sodium hydroxide solution to convert the remaining chloroformate groups into phenolate groups, followed by neutralization with phosphoric acid and by sufficient washing with water. From the resultant solution of the prepolymer in methylene chloride, the methylene chloride is distilled off, followed by drying overnight using a vacuum dryer. The resultant dried prepolymer is pulverized in substantially the same manner as in Example 2 and then charged in a small size Waring blender containing 300 g of acetone while stirring at 1,000 rpm, thereby effecting crystallization and pore formation of the prepolymer. Then, acetone is distilled off to dryness to obtain a dried, porous, crystallized prepolymer. The thus obtained porous, crystallized prepolymer has an Mn of 2,300, an Mw of 4,600, a crystallinity of 28%, a specific surface area of 1.3 m²/g and a molar ratio of terminal hydroxyl groups to terminal phenyl carbonate groups of 45/55. The analysis of chlorine by potentiometric titration and atomic absorption shows that any chlorine-containing compound is not contained in this polymer.

Then, the porous, crystallized prepolymer (which has preliminarily been heated to 140° C.) is subjected to solid-state condensation polymerization using a rotary evaporator under conditions such that the pressure is in the range of from 2 to 3 mmHg and that the temperature is elevated from 140° C. to 180° C. over 10 minutes and further elevated from 180° C. to 220° C. at a temperature elevation rate of 10° C./hr, and then kept at 220° C. for 4 hours, thereby obtaining a porous, crystallized polycarbonate having number average molecular weight of 9,500 and a specific surface area of 0.5 m²/g.

EXAMPLE 8

An aqueous solution prepared by dissolving 62 g of sodium hydroxide in 800 g of water, is mixed with 137 g of bisphenol A, 400 ml of methylene chloride and 1.7 g of phenol to prepare an emulsion. Into the emulsion is gradually blown 55 g of phosgene over a period of 1 hour while stirring and maintaining the temperature at from 10° to 20° C. Into the resultant reaction mixture is blown 6 g of phosgene over a period of 5 minutes. To the mixture, 0.13 g of triethylamine is added, followed by stirring for 1.5 hours. Then, the mixture is subjected to separation of the methylene chloride layer from the aqueous layer and, then, to purification, and subsequently subjected to crystallization and pore formation in substantially the same manner as in Example 7, thereby obtaining a porous, crystallized prepolymer. The thus obtained porous, crystallized prepolymer has an Mn of 3,300, an Mw of 6,500, a crystallinity of 28%, a specific surface area of 1.0 m²/g and a molar ratio of terminal hydroxyl groups to terminal phenyl carbonate groups of 40/60.

The porous, crystallized prepolymer is subjected to solid-state condensation polymerization in substantially the same manner as in Example 7, thereby obtaining a porous, crystallized polycarbonate having a weight average molecular weight of 25,000 (Mw/Mn=2.3) and a specific surface area of 0.5 m²/g.

EXAMPLE 9

Pre-polymerization is conducted in substantially the same manner as in Example 1 except that 13 kg of bisphenol A and 13 kg of diphenyl carbonate are used, thereby obtaining 12 kg of an amorphous prepolymer having an Mn of 3,200 and a molar ratio of terminal hydroxyl groups to terminal phenyl carbonate groups of 50/50. From the bottom portion of the pre-polymerization reactor, 10 kg of the molten amorphous prepolymer at about 240° C. is extruded into an acetone bath filled with 15 kg of acetone from the upper portion of the acetone bath through a die having 40 orifices of 1 mm in diameter over a period of 1 hour. The bottom portion of the acetone bath is connected with a suction port of a centrifugal pump provided with cutter blades (tradename: Santoku Cutter Pump, Model SD-K, manufactured and sold by Sanwa Tokushu Seiko Co., Japan) through a pipe, and a delivery port of the pump is connected with a side portion of the acetone bath through a pipe. By operating the centrifugal pump provided with cutter blades, the contents of the acetone bath are circulated through the acetone bath and the pump. When passed through the pump, the prepolymer is reduced to fine powder by the action of the cutter blades rotating at a high rate. An acetone slurry containing a porous, crystallized prepolymer is obtained by extruding the prepolymer into acetone while operating the pump. The porous, crystallized prepolymer in the acetone slurry has an average particle diameter of 190 µm. Acetone is distilled off from the acetone slurry in substantially the same manner as in Example 1 to dry the porous, crystallized prepolymer. The thus obtained porous, crystallized prepolymer has a specific surface area of 1.9 m²/g and a crystallinity of 31%. Scanning electron micrographs of the porous prepolymer with magnifications of 3,060 and 6,020 are respectively shown in FIGS. 7 and 8.

The porous, crystallized prepolymer is subjected to solid-state condensation polymerization in substantially the same manner as in Example 1 except that the temperature is elevated to 230° C. and kept at 230° C. for 10 hours, thereby obtaining a porous polycarbonate having an ultra-high molecular weight, i.e., an Mn of 26,000 and an Mw of 65,000. After keeping the temperature at 230° C. for 10 hours, the temperature is further elevated to 240° C. and kept at 240° for 10 hours, thereby obtaining a porous, crystallized polycarbonate having an ultra-high molecular weight, i.e., an Mn of 40,000 and Mw of 100,000.

EXAMPLE 10

Pre-polymerization, crystallization and solid-state condensation polymerization are conducted in substantially the same manner as in Example 1 except that 6.5 kg of bisphenol A and 13.3 kg of 2,2-bis[(4-phenyl carbonate)phenyl] propane

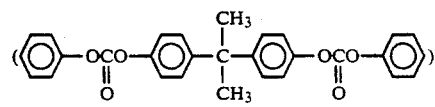

are used in place of 13.0 kg of bisphenol A and 13.4 kg of diphenyl carbonate. By the pre-polymerization and the crystallization, a porous, crystallized prepolymer having an Mn of 2,500, a specific surface area of 0.8

$m^2/g$, a crystallinity of 31% and a molar ratio of terminal hydroxyl groups to terminal phenyl carbonate groups of 42/58 is obtained. By the solid-state condensation polymerization, a porous, crystallized polycarbonate having an Mn of 13,000 is obtained.

EXAMPLE 11

Pre-polymerization and crystallization are conducted in substantially the same manner as in Example 1 except that the amount of diphenyl carbonate is changed to 12.1 kg to obtain a porous, crystallized prepolymer having Mn of 4,300, a specific surface area of 1.5 $m^2/g$, a crystallinity of 30% and a molar ratio of terminal hydroxyl groups to terminal phenyl carbonate groups of 65/35. The porous, crystallized prepolymer is subjected to solid-state condensation polymerization in substantially the same manner as in Example 1 to obtain a porous, crystallized polycarbonate having an Mn of 12,300 and a molar ratio of terminal hydroxyl groups to terminal phenyl carbonate groups of 98/2. That is, the terminals of the obtained porous, crystallized polycarbonate are substantially hydroxyl groups. Incidentally, when the porous, crystallized polycarbonate is reacted, while heating, with glycidyl polyether, which is prepared from bisphenol A and epichlorohydrin, in the presence of triethylenetetramine as a curing agent, a cured product which is insoluble in tetrahydrofuran is obtained.

EXAMPLE 12

An aqueous solution prepared by dissolving 64.8 g of sodium hydroxide in 800 g of water, is mixed with 137 g of bisphenol A, 400 ml of methylene chloride and 1.7 g of phenol to prepare an emulsion. Into the emulsion is gradually blown 58.5 g of phosgene over a period of 1 hour while stirring and maintaining the temperature at 10° to 20° C. to advance a reaction. To the resultant reaction mixture is added a solution prepared by dissolving 0.8 g of ethyl chloroformate in 40 ml of methylene chloride. To the mixture, 6 g of phosgene is blown over a period of 5 minutes and 0.15 g of triethylamine is added, followed by stirring for 2 hours. Then, the resultant mixture is subjected to separation of a methylene chloride layer from an aqueous layer and, then, to purification, and subsequently subjected to crystallization and pore formation in substantially the same manner as in Example 7. Thus, a porous, crystallized prepolymer is obtained. The obtained porous, crystallized prepolymer has an Mn of 3,000, an Mw of 6,300, a specific surface area of 1.3 $m^2/g$, a crystallinity of 25% and a molar ratio of the total of terminal hydroxyl groups and terminal ethyl carbonate groups (molar ratio of terminal hydroxyl groups to terminal ethyl carbonate groups is 26/23) to terminal phenyl carbonate groups of 49/51.

The porous, crystallized prepolymer is charged in a rotary evaporator provided with a heating oven at 180° C., then heated from 180° C. to 220° C. at a temperature elevation rate of 5° C./hr, and kept at 220° C. for 4 hours while rotating the evaporator under reduced pressure of from 2 to 3 mmHg while introducing dry nitrogen little by little to advance a reaction, thereby obtaining a porous, crystallized polycarbonate having a weight average molecular weight of 24,000 (Mw/Mn=2.2) and a specific surface area of 0.6 m2/g.

EXAMPLE 13

An aqueous solution prepared by dissolving 58 g of sodium hydroxide in 800 g of water, is mixed with 124 g bisphenol A, 400 ml of methylene chloride and 1.2 g of phenol to prepare an emulsion. Into the emulsion is gradually blown 53 g of phosgene over a period of 1 hour while stirring and maintaining the temperature at 10° to 20° C. to advance a reaction. Into the resultant reaction solution is further blown 6 g of phosgene over a period of 5 minutes. To the mixture, 0.15 g of triethylamine is added, followed by stirring for 2 hours. Then, the resultant mixture is subjected to separation of an ethylene chloride layer from an aqueous layer and, then, to purification, and subsequently subjected to crystallization and pore formation in substantially the same manner as in Example 7. Thus, a porous, crystallized prepolymer is obtained. The porous, crystallized prepolymer has an Mn of 9,100, a crystallinity of 21%, a specific surface area of 0.8 $m^2/g$ and a molar ratio of terminal hydroxyl groups to terminal phenyl carbonate groups of 40/60.

The porous, crystallized prepolymer is subjected to solid-state condensation polymerization in substantially the same manner as in Example 7 except that the period of time for keeping the prepolymer at 220° C. is changed to 5 hours, to thereby obtain a porous, crystallized polycarbonate having an Mn of 11,200 and a specific surface area of 0.3 $m^2/g$.

EXAMPLE 14

148 g of bisphenol, 1.4 g of p-tert-butyl phenol, 0.8 g of phenol, 0.50 g of methanol, 162 g of dry pyridine and 600 ml of methylene chloride are charged in a flask and 65 g of phosgene is blown into the flask over a period of 90 minutes while stirring and maintaining the temperature at 10° to 20° C. Then, 400 ml of methylene chloride is additionally charged in the flask and 50 ml of methylene chloride containing 5 g of phosgene is dropwise added while stirring and a reaction is advanced for 90 minutes. Then, the resultant reaction mixture is added to 900 ml of 10% by weight hydrochloric acid, followed by sufficiently stirring. Thereafter, the resultant mixture is subjected to separation of a methylene chloride layer from an aqueous layer and, then, to purification, and subsequently subjected to crystallization and pore formation in substantially the same manner as in Example 7. Thus, a porous, crystallized prepolymer is obtained. The porous, crystallized prepolymer has an Mn of 3,600, a crystallinity of 23%, a specific surface area of 1.8 $m^2/g$ and a molar ratio of the total of terminal hydroxyl groups and terminal methyl carbonate groups (molar ratio of terminal hydroxyl groups to terminal methyl carbonate groups is 16/36) to terminal aryl carbonate groups (terminal p-tert-butylphenyl carbonate groups and terminal phenyl carbonate groups) of 52/48.

Then, the porous, crystallized prepolymer is subjected to solid-state condensation polymerization in substantially the same manner as in Example 12 except that the period of time for keeping the prepolymer at 220° C. is changed to 10 hours, thereby obtaining a porous, crystallized polycarbonate having a weight average molecular weight of 24,000 (Mw/Mn=2.5).

EXAMPLE 15

An aqueous solution prepared by dissolving 60 g of sodium hydroxide in 850 g of distilled water is mixed with 146 g of bisphenol A, 400 ml of methylene chloride and 1.7 g of phenol to prepare an emulsion. Into the emulsion is gradually blown 62 g of phosgene at a temperature of from 10° to 20° C. over a period of 1 hour while stirring to effect reaction. Then, a solution prepared by dissolving 1.3 g of terephthaloyl chloride in 160 ml of methylene chloride is added to the reaction mixture. Thereafter, 6.4 g of phosgene is blown into the reaction mixture and, 10 minutes after completion of the blowing, 0.16 g of triethylamine is added thereto. The reaction mixture is stirred for 1 hour.

From the reaction mixtures, a layer of methylene chloride containing a prepolymer is separated. The layer is washed with 0.1N hydrochloric acid and then with water.

Added to the thus obtained methylene chloride solution of the prepolymer is 10 ppm of a disodium salt of bisphenol A. The methylene chloride solution of the prepolymer is subjected to distillation-off of the methylene chloride therefrom and then subjected to crystallization in substantially the same manner as in Example 7, to obtain a porous, crystallized prepolymer. The thus porous, crystallized prepolymer has a number average molecular weight of 3,200, a weight average molecular weight of 6,500, a crystallinity of 25%, and a specific surface area of 1.0 m$^2$/g. The porous, crystallized prepolymer is subjected to solid-state condensation polymerization in substantially the same manner as in Example 12, to obtain a porous, crystallized polycarbonate having a weight average molecular weight of 33,000 (Mw/Mn=2.4).

EXAMPLE 16

An aqueous solution prepared by dissolving 64.8 g of sodium hydroxide in 800 g of distilled water is mixed with 137 g of bisphenol A, 400 ml of methylene chloride and 1.7 g of phenol to prepare an emulsion. Into the emulsion is gradually blown 58.5 g of phosgene at a temperature of from 10° to 20° C. over a period of 2 hours while stirring to advance reaction.

Then, 6 g of phosgene is blown into the reaction mixture over a period of 5 minutes. 0.15 g of triethylamine is added to the reaction mixture, and stirred for two hours. The reaction mixture is subjected to purification and then subjected to crystallization in substantially the same manner as in Example 7, to obtain a porous, crystallized prepolymer. The porous, crystallized prepolymer has a number average molecular weight of 3,300, a weight average molecular weight of 6,500, a crystallinity of 28% and a specific surface area of 1.0 m$^2$/g, and a molar ratio of terminal hydroxyl groups to terminal phenylcarbonate groups of 40:60. 100 g of porous, crystallized prepolymer is charged into a glass-made gas flow type reactor of 50 mm in inner diameter having a glass filter (pore size: about 40–50 μm) attached to one end thereof. Nitrogen gas is fed into the reactor through the glass filter at a gas flow rate of 120 liters (N.T.P.)/hour, and solid-state condensation polymerization is performed at 210° C. under atmospheric pressure for a period of three hours. Thus, there is obtained a porous, crystallized polycarbonate having a weight average molecular weight of 25,000 (Mw/Mn=2.3) and a specific surface area of 0.5 m$^2$/g.

EXAMPLE 17

An aqueous solution prepared by dissolving 64.8 g of sodium hydroxide in 800 g of water is mixed with 137 g of bisphenol A, 400 ml of methylene chloride and 18 g of phenol to prepare an emulsion. Into the emulsion is gradually blown 58.5 g of phosgene at a temperature of from 10° to 20° C. over a period of 1 hour while stirring to effect reaction. Further, 6 g of phosgene is blown into the reaction mixture over a period of 5 minutes, and 0.15 g of triethylamine is added thereto. The reaction mixture is stirred for two hours. A layer of methylene chloride is separated. The separated layer is neutralized with phosphoric acid, and then sufficiently washed with water. After distilling off the methylene chloride, the remainder is vacuum-dried to obtain an oligomer having a molar ratio of terminal hydroxyl groups to terminal phenyl carbonate groups of 2:98. The oligomer has a number average molecular weight of 800. 28.4 g of bisphenol A is mixed with 100 g of the oligomer. The resultant mixture is subjected to melt polymerization at 230° C., and then subjected to crystallization in substantially the same manner as in Example 2, to obtain a porous, crystallized prepolymer having a number average molecular weight of 3,800, a specific surface area of 0.9 m$^2$/g and a molar ratio of terminal hydroxyl groups to terminal phenyl carbonate groups of 58:42. The analysis of this prepolymer shows that any chlorine-containing compound is not contained in the prepolymer. The obtained porous, crystallized prepolymer is subjected to solid-state condensation polymerization in substantially the same manner as in Example 12, to thereby obtain a porous, crystallized polycarbonate having a weight average molecular weight of 28,300 (Mw/Mn=2.4).

EXAMPLE 18

An acetone slurry of porous, crystallized prepolymer obtained in substantially the same manner as in Example 1 is dried to have an acetone content of 35% by weight. The resultant moist powder is subjected to granulation at about 40° C. by using a small size extruder (Pelleter BXKF-1 manufactured and sold by Fuji Powdal Co., Japan), to prepare a granular, crystallized prepolymer having a diameter of about 2 mm and an average length of about 3 mm. The thus prepared granular crystallized prepolymer is dried at 120° C. for 2 hours. The thus obtained granular prepolymer has a number average molecular weight of 4,000, a molar ratio of terminal hydroxyl groups to terminal phenylcarbonate groups of 33/67, a specific surface area of 2.2 m$^2$/g, a compressive break strength of 7 kgf/cm$^2$, and a crystallinity of 22%.

100 g of the granular crystallized prepolymer is placed in a glass-made gas flow type reactor of 50 mm in inner diameter having a glass filter (pore size: about 40–50 μm) attached to one end thereof. Nitrogen gas is introduced into the reactor through the glass filter at a gas flow rate of 150 l(N.T.P.)/hr, and solid-state condensation polymerization is performed under atmospheric pressure at 210° C. for 3 hours. As a result, there is obtained a granular, crystallized polycarbonate having a number average molecular weight of 12,100 and a crystallinity of 45%. The shape of the granular polycarbonate after the polymerization is nearly the same as that of the prepolymer before the polymerization. This means that the pulverization of the granules does not occur during the polymerization.

The granular, porous crystallized polycarbonate has a compressive break strength of 43 kgf/cm$^2$ and an equilibrium moisture content of 0.04%. This equilibrium moisture content is as low as about one-tenth of that of a commercially available amorphous polycarbonate pellet.

EXAMPLE 19

An amorphous prepolymer having a number average molecular weight of 3,800 and a molar ratio of terminal hydroxyl groups to terminal phenyl carbonate groups of 50/50, and containing no chlorine-containing compound therein, which is prepared in substantially the same manner as in Example 1 except that the amount of diphenyl carbonate is changed to 13 kg, is subjected to crystallization and granulation in substantially the same manner as in Example 18, to obtain a granular, porous, crystallized prepolymer of a cylindrical shape having a diameter of about 1 mm and a length of about 3 mm. The thus obtained granular, porous, crystallized prepolymer has a number average molecular weight of 3,800, a molar ratio of terminal hydroxyl groups to terminal phenyl carbonate groups of 50/50, a specific surface of 1.9 m²/g, a compressive break strength of 11 kgf cm², and a crystallinity of 25%.

100 g of the granular, porous, crystallized prepolymer is subjected to solid-state condensation polymerization in substantially the same manner as in Example 18, except that the polymerization is conducted at 210° C. for 3 hours and then at 220° C. for 3 hours, thereby obtaining a granular, porous, crystallized polycarbonate.

The thus obtained granular, porous crystallized polycarbonate has a number average molecular weight of 17,100 and a crystallinity of 51%. The shape of the granular, porous, crystallized polycarbonate after the polymerization is nearly the same as that of the prepolymer before the polymerization. This means that the pulverization of the granules does not occur. The granular, crystallized polycarbonate has a compressive break strength of 55 kgf/cm² and an equilibrium moisture content of 0.04%.

COMPARATIVE EXAMPLE 5

The crystallized prepolymer as prepared in Comparative Example 1 is subjected to granulation in substantially the same manner as in Example 18, to obtain a granular, crystallized prepolymer of a cylindrical shape having a diameter of about 2 mm and a length of about 3 mm. The obtained granular, crystallized prepolymer has a specific surface area of 0.04 m²/g.

The granular, crystallized prepolymer is subjected to solid-state condensation polymerization in substantially the same manner as in Example 18, to obtain a polycarbonate having a number average molecular weight of 8,100. During the polymerization, any pulverization of the granules does not occur.

EXAMPLE 20

Substantially the same moist powder as used in Example 18 is granulated using a compression molding machine under pressure of 1 tf/cm² to obtain a granular, porous, crystallized prepolymer of a cylindrical shape having a diameter of about 10 mm and a length of about 5 mm. The obtained granular, porous, crystallized prepolymer is dried at 120° C. for 2 hours. Then, the granular, porous, crystallized prepolymer has a number average molecular weight of 3,900, a molar ratio of terminal hydroxyl groups to terminal phenylcarbonate groups of 35/65, a specific surface area of 2.1 m²/g, a compressive break strength of 26 kgf/cm², and a crystallinity of 22%.

100 g of the granular, porous, crystallized prepolymer is subjected to solid-state condensation polymerization in substantially the same manner as in Example 18 except that the polymerization is conducted at 220° C. for 2 hours, to obtain a granular, porous, crystallized polycarbonate having a number average molecular weight of 12,900 and a crystallinity of 40%. The shape of the granular, porous, crystallized polycarbonate after the polymerization is nearly the same as that of the prepolymer before the polymerization. This means that the pulverization of the granules does not occur. The granular, porous, crystallized polycarbonate has a compressive break strength of 120 kgf/cm².

EXAMPLES 21 TO 24

Amorphous prepolymers are individually prepared from bisphenol A, diphenyl carbonate and each of dihydroxyaryl compounds indicated in Table 1. Each of the amorphous prepolymers is subjected to crystallization and pore formation, granulation, and solid-state condensation polymerization, in substantially the same manner as in Example 18, to thereby obtain a granular, porous, crystallized, aromatic polycarbonate. The properties of the porous, crystallized prepolymers and the polycarbonates are shown in Table 1. The crystallinity of each of the porous, crystallized prepolymers is in the range of from 20 to 38%. Any pulverization of the granules does not occur during the solid-state condensation polymerization. The crystallinity of each of the granular, porous, crystallized polycarbonates obtained by the solid-state condensation polymerization is in the range of from 40 to 58%.

TABLE 1

| | | Granular, crystallized prepolymer | | | | | Granular, crystallized polycarbonate | |
|---|---|---|---|---|---|---|---|---|
| Example No. | Dihydroxyaryl compound (A) | (A) unit [mole]/ bisphenol A unit [mole] | Molar ratio of terminal hydroxyl groups to terminal phenylcarbonate groups | Number average molecular weight | compressive break strength (kgf/cm²) | specific surface area (m²/g) | Number average molecular weight | Compressive break strength (kgf/cm²) |
| 21 | HO—⟨◯⟩—S—⟨◯⟩—OH | 10/90 | 60/40 | 3,200 | 10.5 | 0.9 | 10,500 | 39 |
| 22 | HO—⟨◯⟩—SO₂—⟨◯⟩—OH | 15/85 | 35/65 | 3,600 | 11.5 | 1.2 | 11,000 | 43 |
| 23 | HO—⟨◯⟩(CH₃)(CH₃)—C(=O)—⟨◯⟩(CH₃)(CH₃)—OH | 5/95 | 50/50 | 4,200 | 9.0 | 1.7 | 13,900 | 60 |

TABLE 1-continued

| | Granular, crystallized prepolymer | | | | | | Granular, crystallized polycarbonate | |
|---|---|---|---|---|---|---|---|---|
| Example No. | Dihydroxyaryl compound (A) | (A) unit [mole]/ bisphenol A unit [mole] | Molar ratio of terminal hydroxyl groups to terminal phenylcarbonate groups | Number average molecular weight | compressive break strength (kgf/cm$^2$) | specific surface area (m$^2$/g) | Number average molecular weight | Compressive break strength (kgf/cm$^2$) |
| 24 | HO—C$_6$H$_2$(CH$_3$)$_2$—CH$_2$—C$_6$H$_2$(CH$_3$)$_2$—OH | 30/70 | 35/65 | 3,900 | 11.0 | 1.3 | 11,200 | 45 |

EXAMPLE 25

Pre-polymerization and crystallization using acetone are conducted in substantially the same manner as in Example 1 except that 13.0 kg of bisphenol A and 13.2 kg of diphenyl carbonate are employed, to obtain a porous, crystallized prepolymer having a number average molecular weight of 4,100, a molar ratio of terminal hydroxyl groups to terminal phenyl carbonate groups of 37/63, a crystallinity of 25%, and a specific surface area of 1.1 m$^2$/g. The thus obtained porous, crystallized prepolymer is charged into a glass-made gas flow type reactor having an inner diameter of 15 mm and provided at its bottom with a glass filter having pores of about 40 to 50 μm in diameter. Then, solid-state condensation polymerization is conducted at 210° C. for 2 hours under atmospheric pressure while introducing nitrogen gas into the reactor through the glass filter at a flow rate of 2.5 l(N.T.P.)/hr relative to 2 g of the porous, crystallized prepolymer, thereby obtaining a porous, crystallized polycarbonate having a number average molecular weight of 10,800.

Examples 26 to 28 and Comparative Examples 6 and 7

In each of these Examples and Comparative Examples, solid-state polymerization is conducted in substantially the same manner as in Example 25, except that the flow rate of nitrogen gas, the reaction time and the reaction temperature are individually changed to those indicated in Table 2, to obtain porous, crystallized polycarbonates. The results are shown in Table 2.

droxyl groups to terminal phenylcarbonate groups of 35/65, a crystallinity of 25%, and a specific surface area of 1.0 m$^2$/g.

The porous, crystallized prepolymer (which has preliminarily been heated to 180° C.) is subjected to solid-state condensation polymerization by using a glass-made gas flow type reactor having an inner diameter of 15 mm under conditions such that the pressure is maintained at atmospheric pressure while introducing, as an inert gas, nitrogen gas which is saturated with phenol at 0° C. (a partial pressure of phenol: 0.028 mmHg), at a flow rate of 1.25 l (N.T.P.)/hr, per g of the porous, crystallized prepolymer, and the temperature is elevated from 180° C. to 210° C. over a period of 30 minutes and then kept at 210° C. for 2.5 hours, thereby obtaining a porous, crystallized polycarbonate having a number average molecular weight of 11,400.

EXAMPLE 30 AND COMPARATIVE EXAMPLE 8

Substantially the same porous, crystallized prepolymer as used in Example 29 is subjected to solid-state condensation polymerization in substantially the same manner as in Example 29 except that nitrogen gases saturated with phenol respectively at 50° C. (Example 30) and at 63° C. (Comparative Example 8) are individually employed as an inert gas, to obtain porous, crystallized polycarbonates. The partial pressure of phenol in the phenol-saturated nitrogen gas and the number average molecular weight of the resultant polycarbonate are shown in Table 3.

TABLE 2

| | Flow rate of N$_2$ [liter (N.T.P)/hr] | ratio of N$_2$* to polymer [liter (N.T.P.)/hr] | Polymerization time [hr] | Temperature (°C.) | Number average molecular weight |
|---|---|---|---|---|---|
| Example 26 | 0.4 | 0.20 | 3 | 220 | 10,600 |
| Example 27 | 1.3 | 0.65 | 3 | 210 | 11,000 |
| Example 28 | 8.0 | 4.0 | 3 | 210 | 12,000 |
| Comparative Example 6 | 0.1 | 0.05 | 8 | 210 | 7,500 |
| Comparative** Example 7 | 16.0 | 8.0 | 3 | 210 | 12,100 |

*Flow rate of N$_2$ relative to 1 g of porous, crystallized prepolymer
**About 30% by weight of the charged prepolymer is entrained by nitrogen gas and escapes out of the condensation polymerization system.

EXAMPLE 29

Pre-polymerization is conducted in substantially the same manner as in Example 1 except that 13.0 kg of bisphenol A and 13.3 kg of diphenyl carbonate are employed. The thus obtained amorphous prepolymer is subjected to crystallization and pore formation using acetone, followed by drying, in substantially the same manner as in Example 1, thereby obtaining a porous, crystallized prepolymer having a number average molecular weight of 4,100, a molar ratio of terminal hy-

TABLE 3

| | Partial pressure of phenol in phenol-saturated nitrogen (mmHg) | Number average molecular weight of polycarbonate |
|---|---|---|
| Example 30 | 2.3 | 6,800 |
| Comparative | 5.7 | 4,300 |
| tive | | |

TABLE 3-continued

| Partial pressure of phenol in phenol-saturated nitrogen (mmHg) | Number average molecular weight of polycarbonate |
| --- | --- |
| Example 8 | |

As is apparent from Table 3, when the partial pressure of phenol in the phenol-saturated nitrogen gas is 2.3 mmHg, the number average molecular weight is promptly increased to 6,800, whereas when the partial pressure of phenol is 5.7 mmHg, the number average molecular weight is only slowly increased to 4,300 from 4,100 of the prepolymer.

EXAMPLE 31

Solid-state condensation polymerization is conducted in substantially the same manner as in Example 29 except that a granular, porous crystallized prepolymer having a diameter of about 1 mm and a length of from about 0.5 to about 2.0 cm, a number average molecular weight of 3,980, a molar ratio of terminal hydroxyl groups to terminal phenyl carbonate groups of 36/64, a crystallinity of 25% and a specific surface area of 0.9 m$^2$/g is employed, thereby obtaining a porous, crystallized polycarbonate having a number average molecular weight of 10,500.

EXAMPLE 32

The same granular, porous, crystallized polycarbonate as used in Example 31 is subjected to solid-state condensation polymerization using a moving bed, gas flow type reactor made of SUS 304 steel having an inner diameter of 15 cm and an effective length of 1 m and provided with an air pump and a gas-cooling device. The granular, porous crystallized polycarbonate is introduced into the reactor from its upper portion at a rate of 1.2 kg/hr at a temperature of 210° C. for 20 hours while introducing nitrogen gas from the bottom portion of the reactor at a flow rate of 6 m$^3$ (N.T.P.)/hour. Nitrogen gas containing phenol is discharged from the reactor, cooled to 0° C. for liquefying and removing excess phenol, and then heated to 210° C. The heated gas is then reintroduced in the reactor. From 7 to 20 hours after the initiation of the operation, a granular, porous crystallized polycarbonate having a number average molecular weight in the range of from 10,800 to 11,000 is recovered from the bottom portion of the reactor at a rate of 1.2 kg/hour. In this method, nitrogen gas is advantageously recycled.

The partial pressure of phenol of the recycled gas at a temperature of 0° C. is 0.028 mmHg, which is calculated by the formula described hereinbefore.

EXAMPLE 33

The same porous, crystallized aromatic polycarbonate as obtained in Example 1 is subjected to press molding at 30° C. under pressure of 1,000 kgf/cm$^2$, to thereby obtain a pressed sheet (15 cm × 15 cm × 3 mm). The sheet has an apparent density of 1.03 g/cm$^3$ and a specific surface area of 0.3 m$^2$/g. Accordingly, the sheet, even after the press molding, is porous.

In a DSC chart of the thus obtained shaped article of porous, crystallized polycarbonate (pressed sheet), a peak representing the crystalline melting point of the polycarbonate is observed at 271° C. The shaped article of porous, crystallized polycarbonate has a crystallinity of 45% and a compressive break strength of 25 kgf/cm$^2$ as measured using an Instron type universal tester.

EXAMPLE 34

A porous, crystallized polycarbonate having Mn of 13,000 as obtained in Example 1 is subjected to press molding at 200° C. under pressure of 500 kgf/cm$^2$, to obtain a pressed sheet (15 cm × 15 cm × 3 mm). The thus obtained shaped article of porous, crystallized polycarbonate (a pressed sheet) has an apparent density of 1.05 g/cm$^3$ and a specific surface area of 0.08 m$^2$/g. The crystallized polycarbonate exhibits a peak of a crystalline melting point at 273° C. in a DSC chart thereof and has a crystallinity of 46% and a compressive-break strength of 150 kgf/cm$^2$ as measured using an Instron type universal tester.

BRIEF DESCRIPTION OF THE DRAWINGS

FIG. 10 and FIG. 11 show examples of X-ray diffraction patterns of a prepolymer before being subjected to crystallization and after being subjected to crystallization, respectively.

INDUSTRIAL APPLICABILITY

Figure 1:
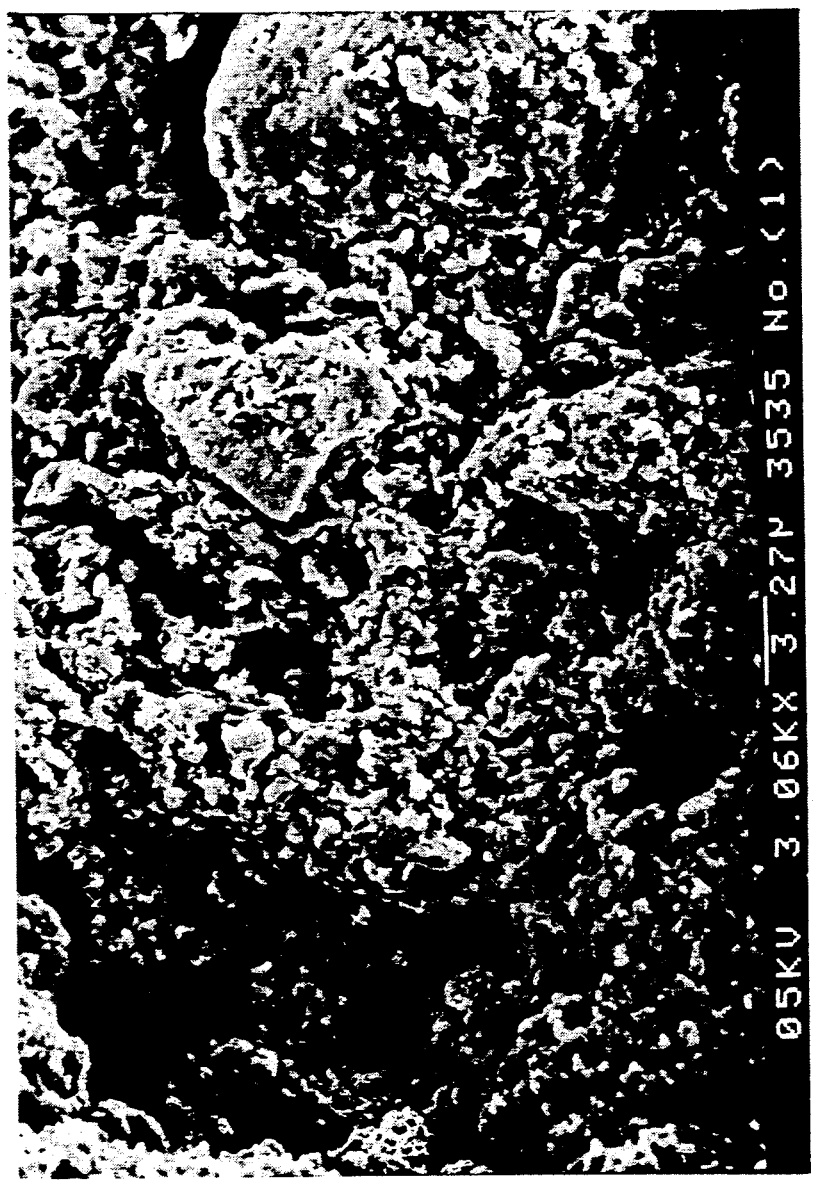
FIG. 1 is a scanning electron micrograph of the surface of the particle of porous, crystallized prepolymer of the present invention obtained in Example 1 (3060 × magnification).
Figure 2:
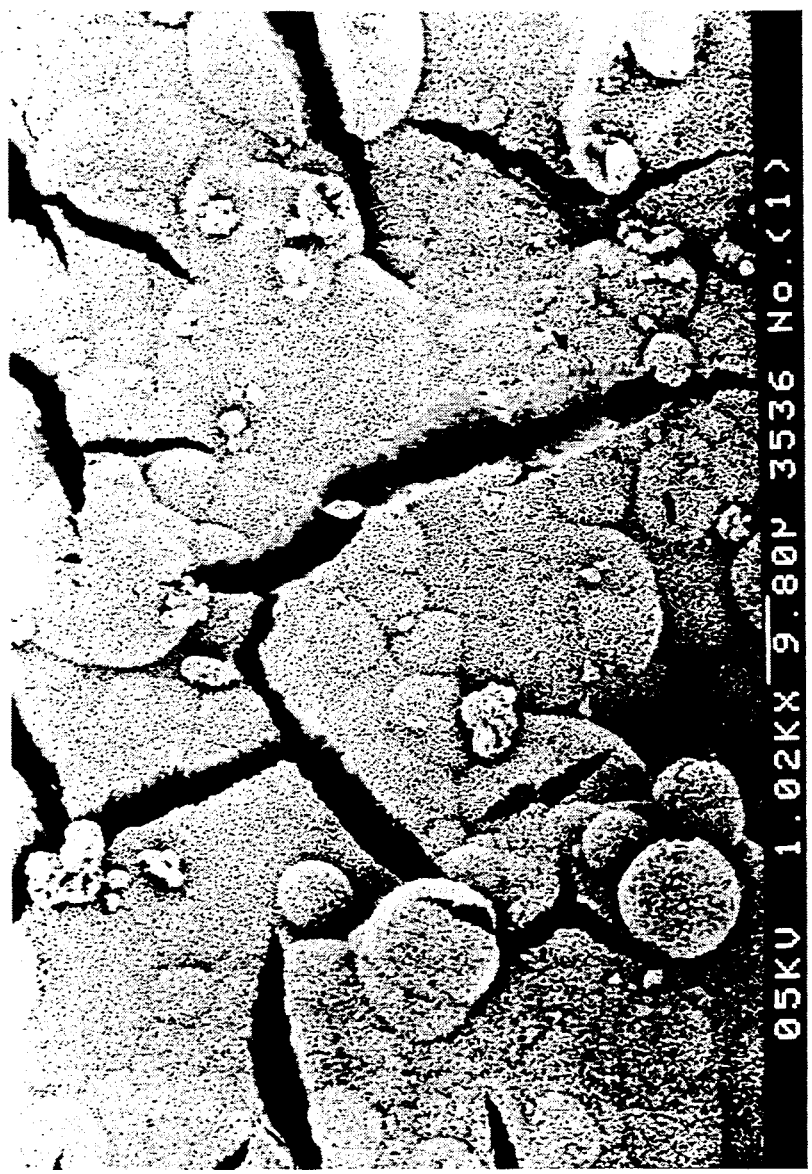
FIG. 2 is a scanning electron micrograph of the cross-section of the particle of porous, crystallized prepolymer of the present invention obtained in Example 1, which has been broken with forceps (1020 × magnification).
Figure 3:
FIG. 3 is a scanning electron micrograph of the amorphous prepolymer (I) obtained by pre-polymerization in Example 1 (4400 × magnification).
Figure 4:
FIG. 4 is a scanning electron micrograph of the surface of the particle of porous, crystallized prepolymer obtained in Example 2 (1020 × magnification).
Figure 5:
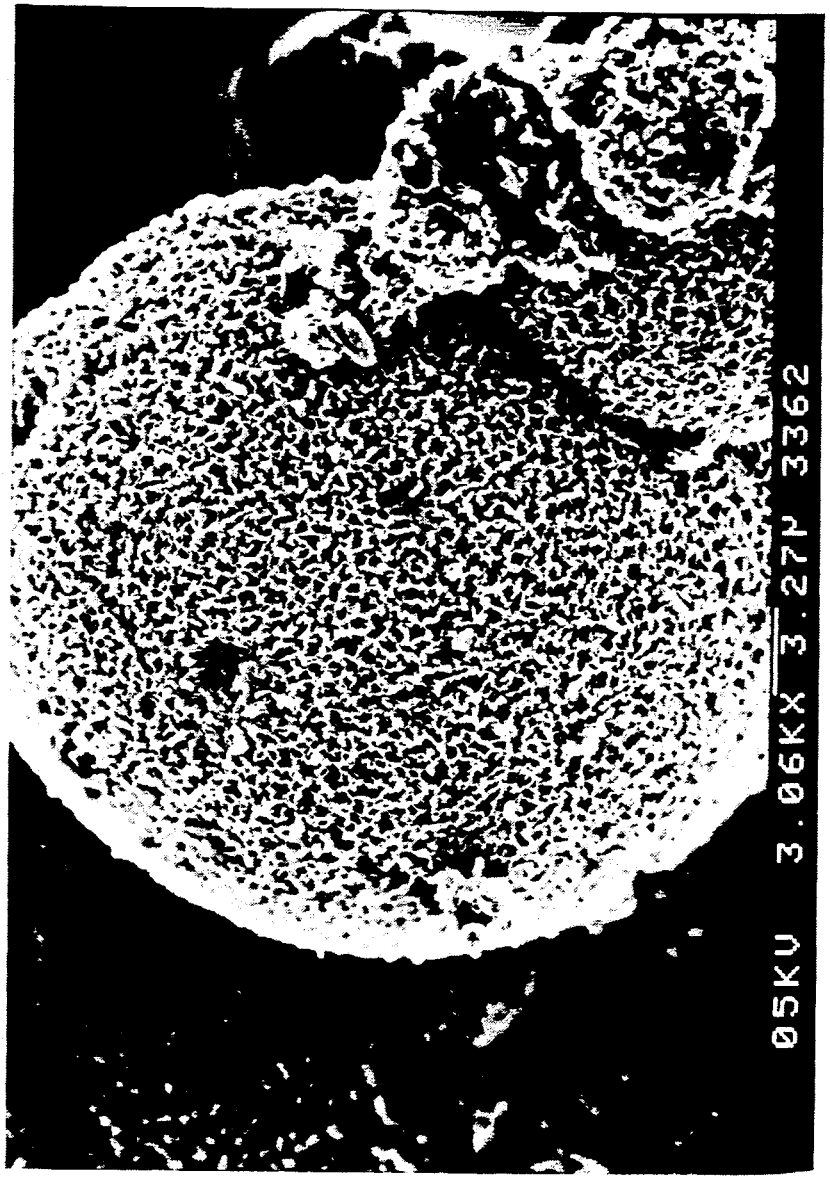
FIG. 5 is a scanning electron micrograph of a portion of the particle shown in FIG. 4, which is taken with higher magnification (3060 × magnification).
Figure 6:
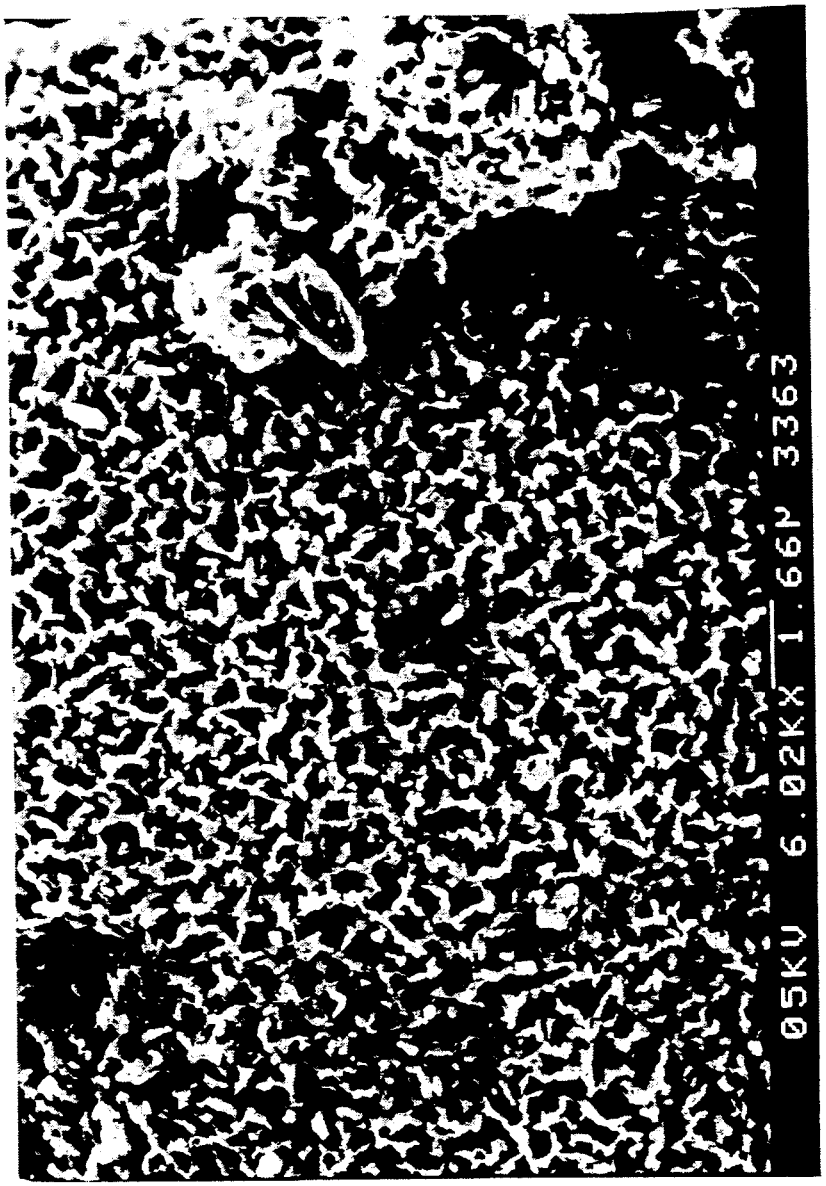
FIG. 6 is a scanning electron micrograph of a portion of the particle shown in FIG. 5, which is taken with higher magnification (6020 × magnification).
Figure 7:
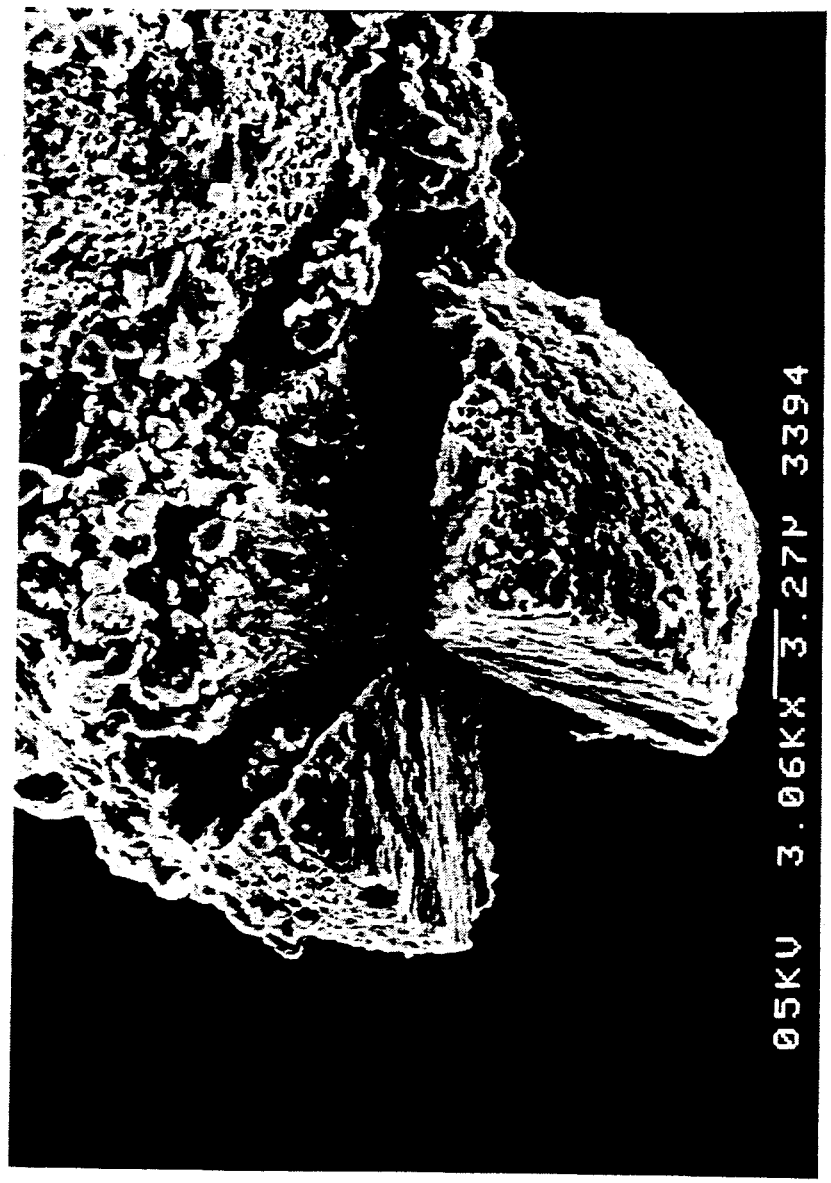
FIG. 7 is a scanning electron micrograph of the particle of porous, crystallized prepolymer of the present invention obtained in Example 9 (3060 × magnification).
Figure 8:
FIG. 8 is a scanning electron micrograph of a portion of the particle shown in FIG. 7, which is taken with higher magnification (6020 × magnification).
Figure 9:
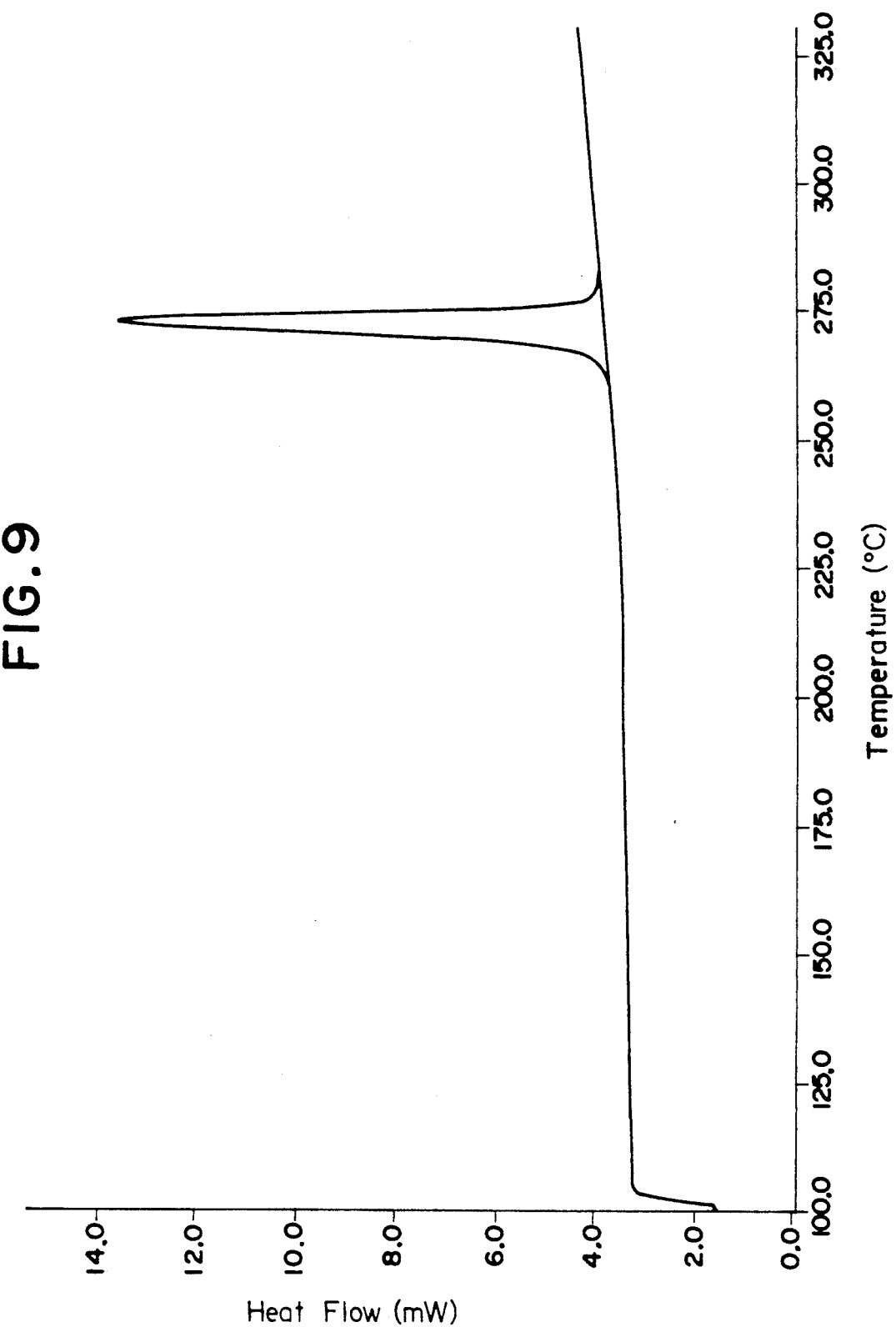
FIG. 9 is a DSC chart of the porous, crystallized, polycarbonate of the present invention obtained in Example 1.

The porous, crystallized, aromatic polycarbonate prepolymer of the present invention can readily be converted by solid-state condensation polymerization to a porous, crystallized, aromatic polycarbonate. The porous, crystallized, aromatic polycarbonate of the present invention can readily be molded to obtain a shaped, porous, crystallized polycarbonate. The porous, crystallized, aromatic polycarbonate and the shaped, porous, crystallized polycarbonate of the present invention have excellent heat resistance and solvent resistance and exhibit advantageously low water absorption so that these are suited for use as a filter material, an adsorbent or the like. The porous, crystallized, aromatic polycarbonate and the shaped, porous, crystallized polycarbonate of the present invention can also readily be molded by a melt process into an article useful as engineering plastics, such as an optical element and an electronic component.

The conventional phosgene process has drawbacks in that chlorine-containing compounds attributed to phosgene as a raw material and methylene chloride as a solvent inevitably remain in the final polycarbonate product despite complicated, costly steps for removing them, and in that it is difficult to obtain a polycarbonate having an ultra-high molecular weight. On the other hand, the conventional transesterification process also has drawbacks in that a highly expensive reactor usable under extremely high temperature and vacuum conditions is necessary, and that it is difficult to perform polymerization without thermal degradation and to obtain a polycarbonate having an ultra-high molecular weight.

By contrast, the prepolymer and the polycarbonate of the present invention are free from the above-mentioned drawbacks of the prior art processes. Moreover, in the present invention, a reactive hydroxyl group can readily be introduced in an aromatic polycarbonate.

Accordingly, the porous, crystallized, aromatic polycarbonate prepolymers and porous, crystallized aromatic polycarbonates of the present invention as well as the production methods of the present invention, can advantageously be utilized, especially in the field of engineering plastics which have been rising in importance.

We claim:

1. A porous, crystallized, aromatic polycarbonate prepolymer comprising recurring aromatic carbonate units and terminal hydroxyl and aryl carbonate groups, wherein the molar ratio of the terminal hydroxyl groups to the terminal aryl carbonate groups is from 5/95 to 95/5, and having a number average molecular weight of from 1,000 to 15,000, a specific surface area of at least 0.2 $m^2/g$ and a crystallinity of at least 5%.

2. A prepolymer according to claim 1, wherein the specific surface area of the prepolymer is at least 0.5 $m^2/g$.

3. A prepolymer according to claim 1, wherein the crystallinity of the prepolymer is not greater than 55%.

4. A prepolymer according to claim 1, wherein the ratio of the terminal hydroxyl groups to the terminal aryl carbonate groups is from 10/90 to 90/10.

5. A prepolymer according to any one of claims 1 to 4, which is in powder form.

6. A prepolymer according to any one of claims 1 to 4, which is in agglomerated powder form.

7. A prepolymer according to any one of claims 1 to 4, which is in granular form.

8. A prepolymer according to claim 7, which has a compressive break strength of at least 5 $kgf/cm^2$.

9. A prepolymer according to any one of claims 1 to 4, which is for use as a prepolymer to be subjected to solid-state condensation polymerization.

10. A prepolymer according to claim 5, which is for use as a prepolymer to be subjected to solid-state condensation polymerization.

11. A prepolymer according to claim 6, which is for use as a prepolymer to be subjected to solid-state condensation polymerization.

12. A prepolymer according to claim 7, which is for use as a prepolymer to be subjected to solid-state condensation polymerization.

13. A prepolymer according to claim 8, which is for use as a prepolymer to be subjected to solid-state condensation polymerization.

14. A method for producing a powder form of porous, crystallized, aromatic polycarbonate prepolymer, which comprises treating an amorphous aromatic polycarbonate prepolymer with solvent under sufficient shearing force to crystallize and render porous said amorphous aromatic polycarbonate prepolymer, said amorphous aromatic polycarbonate prepolymer comprising recurring carbonate units and terminal hydroxyl and aryl carbonate groups, wherein the molar ratio of the terminal hydroxyl groups to the terminal aryl carbonate groups is from 5/95 to 95/5, and having a number average molecular weight of 1,000 to 15,000, said shearing force being sufficient to cause the resultant powdery, porous, crystallized, aromatic polycarbonate prepolymer to have an average particle diameter of 250 $\mu m$ or less.

15. A method for producing an agglomerated powder form of porous, crystallized aromatic polycarbonate prepolymer, which comprises applying sufficient pressure or heat to particles of a powder form of porous, crystallized aromatic polycarbonate prepolymer to cause the particles to be cohered, the prepolymer of said powder form of prepolymer being prepolymer according to claim 1.

16. A method according to claim 15, wherein the specific surface area of the powder form of prepolymer is at least 0.5 $m^2/g$.

17. A method according to claim 15, wherein the crystallinity of the powder form of prepolymer is not greater than 55%.

18. A method for producing a granular form of porous, crystallized, aromatic polycarbonate prepolymer, which comprises granulating a powder form or an agglomerated powder form of porous, crystallized, aromatic polycarbonate prepolymer, the prepolymer of said powder form or of said agglomerated powder form of prepolymer is prepolymer according to claim 1.

19. A method according to claim 18, wherein the specific surface area of the powder form or of the agglomerated powder form of prepolymer is at least 0.5 $m^2/g$.

20. A method according to claim 18, wherein the crystallinity of the powder form or of the agglomerated powder form of prepolymer is not greater than 55%.

21. A method according to claim 18, 19 or 20, wherein the granulation of the powder form or of the agglomerated powder form of prepolymer is performed by extrusion-granulation or by compression-granulation.

22. A porous crystallized aromatic polycarbonate prepolymer which is at least substantially the same as that produced by a method of one of claims 14 to 17 and 18 to 20.

23. A porous crystallized aromatic polycarbonate prepolymer which is at least substantially the same as that produced by a method of claim 21.

* * * * *

UNITED STATES PATENT AND TRADEMARK OFFICE
CERTIFICATE OF CORRECTION

PATENT NO. : 5,204,377
DATED : April 20, 1993
INVENTOR(S) : FUKAWA et al.

It is certified that error appears in the above-indentified patent and that said Letters Patent is hereby corrected as shown below:

Column 1, lines 50 and 52, "are" (each occurrence) should read --is--.

Signed and Sealed this

Fourth Day of January, 1994

Attest:

BRUCE LEHMAN

Attesting Officer

Commissioner of Patents and Trademarks